United States Patent
Matsushima et al.

(10) Patent No.: US 8,438,402 B2
(45) Date of Patent: May 7, 2013

(54) ELECTRONIC TERMINAL, CONTROL METHOD, COMPUTER PROGRAM AND INTEGRATED CIRCUIT

(75) Inventors: Hideki Matsushima, Osaka (JP); Natsume Matsuzaki, Osaka (JP); Kaoru Yokota, Hyogo (JP); Tomoyuki Haga, Nara (JP)

(73) Assignee: Panasonic Corporation, Osaka (JP)

( * ) Notice: Subject to any disclaimer, the term of this patent is extended or adjusted under 35 U.S.C. 154(b) by 317 days.

(21) Appl. No.: 12/919,313

(22) PCT Filed: Mar. 19, 2009

(86) PCT No.: PCT/JP2009/001240
§ 371 (c)(1),
(2), (4) Date: Aug. 25, 2010

(87) PCT Pub. No.: WO2009/119049
PCT Pub. Date: Oct. 1, 2009

(65) Prior Publication Data
US 2011/0004771 A1    Jan. 6, 2011

(30) Foreign Application Priority Data
Mar. 25, 2008    (JP) .................................. 2008-077435

(51) Int. Cl.
*G06F 21/24*    (2006.01)
(52) U.S. Cl.
USPC ............................................ 713/189; 726/26
(58) Field of Classification Search .................. None
See application file for complete search history.

(56) References Cited

U.S. PATENT DOCUMENTS

| | | | |
|---|---|---|---|
| 7,698,733 B2 | 4/2010 | Kutaragi et al. | |
| 2007/0022090 A1* | 1/2007 | Graham | 707/1 |
| 2009/0113549 A1* | 4/2009 | Jin et al. | 726/25 |
| 2009/0113552 A1* | 4/2009 | Jin et al. | 726/25 |

FOREIGN PATENT DOCUMENTS

| | | |
|---|---|---|
| JP | 2001-16655 | 1/2001 |
| JP | 2002-334511 | 11/2002 |
| JP | 2003-524925 | 8/2003 |
| JP | 2004-206683 | 7/2004 |

OTHER PUBLICATIONS

Ivan Balepin et al, Using Specefication-Based Intrusion Detection for authomated response LNCS vol. 2830: Recent Advances in Intrusion Detection, Jan. 1, 2003,pp. 136-154, XP 55031958.*

(Continued)

*Primary Examiner* — Fikremariam A Yalew
(74) *Attorney, Agent, or Firm* — Wenderoth, Lind & Ponack, L.L.P.

(57) ABSTRACT

An electronic terminal performs early detection of unauthorized analysis thereon and prevents unauthorized acquisition and falsification of confidential information that is not to be released to a third party. The electronic terminal stores confidential information that is protected by consecutive application of a plurality of protection measures for defense against an attack from a third party. The electronic terminal monitors for attacks to the protection measures from an external source, and upon detecting an attack on one protection measure, updates a protection state of the confidential information to a new protection state in which either a new protection measure has been added to a protection path from the one attacked protection means to the confidential information, or the one protection measure on the path has been updated to a higher defense level.

13 Claims, 20 Drawing Sheets

OTHER PUBLICATIONS

International Search Report issued Jun. 23, 2009 in International (PCT) Application No. PCT/JP2009/001240.
Supplementary European Search Report dated Jul. 17, 2012 in corresponding European Patent Application No. 09725211.8.
Ivan Balepin et al., "Using Specification-Based Intrusion Detection for Automated Response", LNCS vol. 2820: Recent Advances in Intrusion Detection, Jan. 1, 2003, pp. 136-154, XP55031958, D01:10, 1007/978-3-540-45248-5_8, ISBN:978-3-54-040878-9, Retrieved from the Internet: URL:http://www.springerlink.com/content/gt, VY0d0dexr50x1c/fulltext.pdf?MUD=MP [retrieved on Jul. 5, 2012], abstract, pp. 146-159, figure 3.

* cited by examiner

T100

| Transmission flag | Date and time | Protection identifier |
|---|---|---|
| 1 | 200801011030 | Point 1-1 |
| 0 | 200801021030 | Point 2-1 |

| Management ID | Date and time | Protection identifier |
|---|---|---|
| 001 | 200801011030 | Point 1-1 |
| 001 | 200801021030 | Point 2-1 |
| 003 | 200801031030 | Point 1-1 |
| 002 | 200801051030 | Point 1-1 |

FIG. 18

Defense level table

T300

| Protection measure management ID | Protection measure | Defense level |
|---|---|---|
| ID1 | Encryption A | 2 |
| ID2 | Code obfuscation A | 2 |
| ID3 | Debugger disabling | 5 |
| ID4 | Debugger terminal concealment | 10 |
| ID5 | Encryption B | 8 |
| ID6 | Code obfuscation B | 10 |

FIG. 19

Protection measure correspondence table

T400

| Protection measure management ID | Protection measure | Point of use |
|---|---|---|
| ID1 | Encryption A | Point1-2 |
| ID2 | Code obfuscation A | Point2-3 |
| ID3 | Debugger disabling | Point2-2 |
| ID4 | Debugger terminal concealment | Point1-1, Point2-1 |

ELECTRONIC TERMINAL, CONTROL METHOD, COMPUTER PROGRAM AND INTEGRATED CIRCUIT

TECHNICAL FIELD

The present invention relates to technology for preventing unauthorized analysis of information (property) that is stored on an electronic terminal and should not be released to a third party.

BACKGROUND ART

In recent years, distribution and sale of digital content on high-capacity portable media such as DVD (Digital Versatile Disk) and BD (Blu-Ray Disc) have become commonplace. In the video game industry also, many games are currently sold on such portable media, and nearly all console game systems are equipped with a disc-reading device.

However, when game systems use this type of general-purpose media, it is possible to use a general-purpose application on a PC (Personal Computer) to make an unauthorized copy of the media.

To solve this problem, Patent Document 1 discloses technology in which a server manages a pair of IDs, namely a disc ID that is unique to a disc and a device ID that is unique to a device. When the disc is to be used, the disc ID and the device ID are sent to the server via a network, and the server authenticates whether the use is authorized.

Patent Document 1: Japanese Patent Application Publication No. 2002-334511

SUMMARY OF INVENTION

Technical Problem

However, in the technology disclosed in Patent Document 1 in which pairs of disc IDs and device IDs are managed and compared, if the device itself has undergone unauthorized modification, such modification cannot be detected. In other words, by performing unauthorized analysis on a device and adding a modification to the device, a third party can transmit a disc ID that is different from the disc ID intended by the manufacturer, and then falsify a device ID, thus enabling unauthorized use. In this case, it is impossible for an administrator who manages user activity to become aware of the unauthorized analysis of the device until unauthorized use becomes widespread. For this reason, measures for handling unauthorized use are taken too late.

In view of this, the present invention aims to provide an electronic terminal, a control method, a computer program and an integrated circuit for early detection of unauthorized analysis of a device, and for preventing unauthorized acquisition and falsification of confidential information that is not to be revealed to a third party.

Solution to the Problem

In order to solve the above problems, an electronic terminal that is one aspect of the present invention includes a first storage unit for storing therein confidential information to be protected; a plurality of protection measures that are provided along an attack route extending from an external source to the confidential information stored in the first storage unit, and are operable to intercept an access from the external source to the confidential information via the attack route; a plurality of monitoring units operable to monitor for an attack to any of the plurality of protection measures from the external source; a second storage unit for storing therein (i) value information that is attached to the confidential information and expresses a value of the confidential information, and (ii) a plurality of defense level information pieces each attached to one of the plurality of protection measures and expressing a defense level value of a corresponding protection measure against an attack from the external source; and a control unit operable to, when an attack to any of the plurality of protection measures has been detected, and a sum of defense level values for protection measures that have not been attacked remaining on a partial route of the attack route extending between the attacked protection measure and the confidential information is less than the value expressed by the value information, update a protection measure that can be updated among the remaining protection measures on the partial route, so that the sum of the defense level values on the partial route is greater than the value expressed by the value information.

Advantageous Effects of Invention

According to the above structure, when it is detected that any of a plurality of protection measures has been attacked and the sum of defense level values corresponding to protection measures remaining on a partial route is lower than the value expressed by the value information, a protection measure that can be updated among the protection measures remaining on the partial route is updated so that the sum of the defense level values on the partial route becomes larger than the value expressed in the value information. This enables protecting the confidential information in a new protection state in which the existing protection measures have been strengthened. This enables preventing a third party from illicitly acquiring or falsifying the confidential information.

BRIEF DESCRIPTION OF DRAWINGS

FIG. 6 shows an exemplary data structure of a history management table T200;

FIG. 18 shows an exemplary data structure of a defense level table T300;

FIG. 19 shows an exemplary data structure of a protection measure correspondence table T400;

Figure 1:
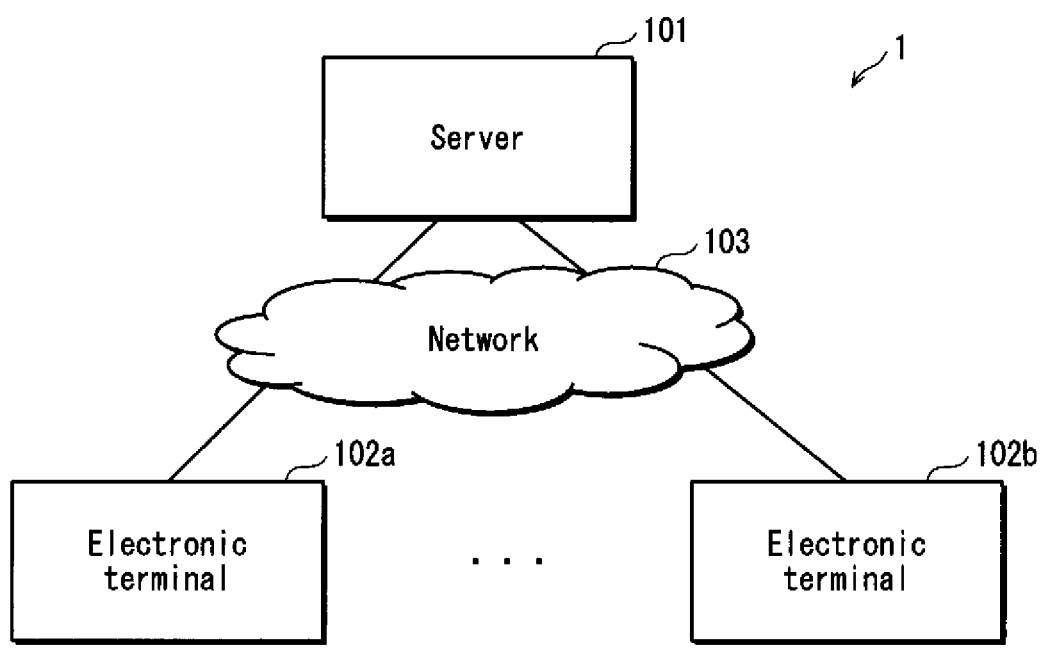
FIG. 1 shows the main structure of an unauthorized-analysis prevention system 1.

REFERENCE SIGNS LIST 1 unauthorized-analysis prevention system
101 server
102, 102a, 102b electronic terminals
103 network
201 detection information generation unit
202 signature attachment unit
203 date and time information acquisition unit
204 storage destination selection unit
205 history management unit
206 model storage unit
207 defense level calculation unit
208 update requirement judgment unit
209 update location determination unit
210 update request generation unit
211, 211a, . . . , 211n monitoring units
212 protection method reception unit
213 protection method update unit
214 transmission unit
215 identifier storage unit
216 secure information storage unit
302 reception unit
304 history management unit
306 protection method selection unit
308 protection method storage unit
310 protection method delivery unit
312 detection information reception unit

DESCRIPTION OF EMBODIMENTS

The electronic terminal that is one aspect of the present invention includes: a first storage unit for storing therein confidential information to be protected; a plurality of protection measures that are provided along an attack route extending from an external source to the confidential information stored in the first storage unit, and are operable to intercept an access from the external source to the confidential information via the attack route; a plurality of monitoring units operable to monitor for an attack to any of the plurality of protection measures from the external source; a second storage unit for storing therein (i) value information that is attached to the confidential information and expresses a value of the confidential information, and (ii) a plurality of defense level information pieces each attached to one of the plurality of protection measures and expressing a defense level value of a corresponding protection measure against an attack from the external source; and a control unit operable to, when an attack to any of the plurality of protection measures has been detected, and a sum of defense level values for protection measures that have not been attacked remaining on a partial route of the attack route extending between the attacked protection measure and the confidential information is less than the value expressed by the value information, update a protection measure that can be updated among the remaining protection measures on the partial route, so that the sum of the defense level values on the partial route is greater than the value expressed by the value information.

According to this structure, the electronic terminal can protect the confidential information in a new protection state in which the existing protection measures have been strengthened, since when an attack to any of the plurality of protection measures has been detected, and a sum of defense level values for protection measures remaining on the partial route is less than the value expressed by the value information, the electronic terminal updates a protection measure that can be updated among the remaining protection measures on the partial route so that the sum of the defense level values on the partial route is greater than the value expressed by the value information. This enables preventing unauthorized acquisition and falsification of the confidential information by a third party.

Here, the confidential information may be encrypted by a predetermined algorithm, and the protection measure that can be updated may be a program for executing a decryption algorithm for decrypting the encrypted confidential information.

According to this structure, since the electronic terminal updates the program that executes the predetermined algorithm for encrypting the confidential information so that the sum of the defense level values on the partial route is greater than the value expressed by the value information, the defense level value of the program increases, and thus the defense level of the program can be strengthened compared to the defense level of the program before the update.

Here, the electronic terminal may further include: a third storage unit for storing therein a key generation program for generating a decryption key to be used in decrypting the confidential information that has been encrypted by a predetermined algorithm; a plurality of second protection measures that are provided along a second attack route extending to the confidential information stored in the first storage unit, via the key generation program stored in the third storage unit, and are operable to intercept an access from the external source to the key generation program via the second attack route; and a plurality of second monitoring units operable to monitor for an attack to any of the plurality of second protection measures from the external source. A plurality of defense level information pieces may be each attached to one of the plurality of second protection measures, each expressing a defense level value of a corresponding second protection measure against an attack from the external source, and the control unit may be further operable to, when an attack to any of the second protection measures has been detected, and a sum of the defense level values for protection measures that have not been attacked remaining on a second partial route of the second attack route extending between the attacked second protection measure and the confidential information, is less than the value expressed by the value information, update the key generation program so that the sum of the defense level values on the second partial route is greater than the value expressed by the value information.

According to this structure, since the electronic terminal monitors second protection measures existing on a second partial route of the second attack route from an external source to the confidential information via the key generation program, as well as monitoring the protection measures existing on the attack route from the external source to the confidential information, monitoring can be performed more reliably against an attack from a third party. Also, when the total of the defense level values on the second partial route is less than the value of the confidential information, since the electronic terminal updates the key generation program so that the total of the defense level values on the second partial route is greater than the value expressed by the confidential information, this structure also enables strengthening defenses against an attack to the second partial route.

Here, the electronic terminal may further include: a third storage unit for storing therein a decryption key to be used in decrypting the confidential information that has been encrypted by a predetermined algorithm; a fourth storage unit for storing therein a predetermined program for accessing the decryption key; a plurality of second protection measures that are provided along a second attack route extending to the confidential information stored in the first storage unit, via the predetermined program stored in the fourth storage unit, and are operable to intercept an access from the external source to the predetermined program via the second attack route; and a plurality of second monitoring units operable to monitor for an attack to any of the plurality of second protection measures from the external source. A plurality of defense level information pieces are each attached to one of the plurality of second protection measures, each expressing a defense level value of a corresponding second protection measure against an attack from the external source, and the control unit is further operable to, when an attack to any of the second protection measures has been detected, and a sum of the defense level values for protection measures that have not been attacked remaining on a second partial route of the second attack route extending between the attacked second protection measure and the confidential information, is less than the value expressed by the value information, update the predetermined program so that the sum of the defense level values on the second partial route is greater than the value expressed by the value information.

According to this structure, since the electronic terminal monitors second protection measures existing on a second partial route of the second attack route from an external source to the confidential information via the predetermined program for accessing the decryption key, as well as monitoring the protection measures existing on the attack route from the external source to the confidential information, monitoring can be performed more reliably against an attack from a third party. Also, when the total of the defense level values on the second partial route is less than the value expressed by the confidential information, since the electronic terminal updates the predetermined program so that the total of the defense level values on the second partial route is greater than the value expressed by the confidential information, this structure also enables strengthening defenses against an attack to the second partial route.

Here, the predetermined program for accessing the decryption key may be a decryption program for decrypting the encrypted decryption key when the decryption key has been encrypted.

According to this structure, the electronic terminal can strengthen defenses against an attack to the decryption key by updating the decryption program.

Here, the decryption program may have been obfuscated.

According to this structure, the electronic terminal can strengthen defenses against an attack to the decryption key by updating the obfuscated decryption program.

Here, the electronic terminal may further include a third storage unit for storing therein a protection measure to be used for performing an update. The control unit may update the protection measure that can be updated with use of the protection measure to be used for performing the update, that is stored in the third storage unit.

According to this structure, the electronic terminal can update a protection measure that can be updated upon detecting an attack from an external source, without requiring another device.

Here, the electronic terminal may further include a communication unit connected to an external management device that manages the electronic terminal. The control unit may be further operable to, when an attack to any of the plurality of protection measures has been detected, and a sum of the defense level values for protection measures remaining on the partial route is less than the value expressed by the value information, transmit detection information indicating the detection and the comparison to the management device via the communication unit, receive a new protection measure from the management device, in accordance with the detection information, such that the sum of the defense level values for the protection measures remaining on the partial route is greater than the value expressed by the value information, and update the protection measure that can be updated to the new protection measure.

Also, the electronic terminal may further include a communication unit connected to an external management device that manages the electronic terminal. The control unit may be further operable to, when an attack to any of the plurality of protection measures has been detected, and a sum of the defense level values for remaining protection measures on the partial route is less than the value expressed by the value information, transmit detection information indicating the detection and the comparison to the management device via the communication unit, receive a new protection measure from the management device, in accordance with the detection information, such that the sum of the defense level values for the protection measures remaining on the partial route is greater than the value expressed by the value information, and add the new protection measure to the partial route.

According to this structure, since the electronic terminal receives, from the external management device, a new protection measure for updating or being added, it is not necessary for the electronic terminal to include storage capacity for internally storing a new protection measure in advance. A new protection measure that is stored in advance would also require use of some protection mechanism to protect from an attack by a third party. For such reasons, the present structure enables reducing manufacturing cost over a case of storing a new protection measure internally in advance.

Here, the electronic terminal may further include: a communication unit connected to an external management device that manages the electronic terminal; and a third storage unit for storing therein a plurality of second defense level information pieces received from the management device, each expressing an updated value of a defense level value of a corresponding protection measure. The control unit may be further operable to (i) compare each piece of defense level information stored in the second storage unit to a piece of corresponding defense level information stored in the third storage unit, (ii) when a result of the comparison is that the defense level value expressed by the defense level information is less than the defense level value expressed by the second defense level information, calculate a sum of defense levels for the plurality of protection measures with reference to the second defense level information, and (iii) when the calculated sum is less than the value expressed by the value information, update a protection measure corresponding to the second defense level information that is less than the defense level information so that the total of the defense level values on the attack route is greater than the value expressed by the value information.

According to this structure, when the defense level value after an update is less than the defense level value before the update as a result of updating a protection measure, even when the electronic terminal has not detected an attack from a third party, the electronic terminal updates the protection measure so that the defense level value of the attack route is higher than the value expressed by the confidential information. Therefore, the defense of the attack route is strengthened over the defense of the attack route before the update.

Also, another aspect of the present invention is a control method for an electronic terminal, the electronic terminal including: a first storage unit for storing therein confidential information to be protected; a plurality of protection measures that are provided along an attack route extending from an external source to the confidential information stored in the first storage unit, and are operable to intercept an access from the external source to the confidential information via the attack route; a plurality of monitoring units operable to monitor for an attack to any of the plurality of protection measures from the external source; and a second storage unit for storing therein (i) value information that is attached to the confidential information and expresses a value of the confidential information, and (ii) a plurality of defense level information pieces each attached to one of the plurality of protection measures and expressing a defense level value of a corresponding protection measure against an attack from the external source. In the control method, when an attack to any of the plurality of protection measures has been detected, a judgment is made whether a sum of defense level values for protection measures that have not been attacked remaining on a partial route of the attack route extending between the attacked protection measure and the confidential information is less than the value expressed by the value information, and if the sum is less than the value, a protection measure that can be updated among the remaining protection measures on the partial route is updated so that the sum of the defense level values on the partial route is greater than the value expressed by the value information.

Also, another aspect of the present invention is a computer program for performing control on an electronic terminal, the electronic terminal including: a first storage unit for storing therein confidential information to be protected; a plurality of protection measures that are provided along an attack route extending from an external source to the confidential information stored in the first storage unit, and are operable to intercept an access from the external source to the confidential information via the attack route; a plurality of monitoring units operable to monitor for an attack to any of the plurality of protection measures from the external source; and a second storage unit for storing therein (i) value information that is attached to the confidential information and expresses a value of the confidential information, and (ii) a plurality of defense level information pieces each attached to one of the plurality of protection measures and expressing a defense level value of a corresponding protection measure against an attack from the external source. The computer program causes a computer of the electronic terminal to perform the processing of: judging, when an attack to any of the plurality of protection measures has been detected, whether a sum of defense level values for protection measures that have not been attacked remaining on a partial route of the attack route extending between the attacked protection measure and the confidential information is less than the value expressed by the value information, and if the sum is less than the value, updating a protection measure that can be updated among the remaining protection measures on the partial route so that the sum of the defense level values on the partial route is greater than the value expressed by the value information.

According to the above-described control method and computer program, the electronic terminal can protect the confidential information in a new protection state in which the existing protection measures have been strengthened, since when an attack to any of the plurality of protection measures has been detected, and a sum of defense level values for protection measures that have not been attacked remaining on a partial route of the attack route extending between the attacked protection measure and the confidential information is less than the value expressed by the value information, the electronic terminal updates a protection measure that can be updated among the remaining protection measures on the partial route so that the sum of the defense level values on the partial route is greater than the value expressed by the value information. This enables preventing unauthorized acquisition and falsification of the confidential information by a third party.

Also, another aspect of the present invention is an integrated circuit used in an electronic terminal, the electronic terminal including: a first storage unit for storing therein confidential information to be protected; a plurality of protection measures that are provided along an attack route extending from an external source to the confidential information stored in the first storage unit, and are operable to intercept an access from the external source to the confidential information via the attack route; a plurality of monitoring units operable to monitor for an attack to any of the plurality of protection measures from the external source; a second storage unit for storing therein (i) value information that is attached to the confidential information and expresses a value of the confidential information, and (ii) a plurality of defense level information pieces each attached to one of the plurality of protection measures and expressing a defense level value of a corresponding protection measure against an attack from the external source; and a control unit operable to, when an attack to any of the plurality of protection measures has been detected, and a sum of defense level values for protection measures that have not been attacked remaining on a partial route of the attack route extending between the attacked protection measure and the confidential information is less than the value expressed by the value information, update a protection measure that can be updated among the remaining protection measures on the partial route, so that the sum of the defense level values on the partial route is greater than the value expressed by the value information.

According to this structure, the integrated circuit can protect the confidential information in a new protection state in which the existing protection measures have been strengthened, since when an attack to any of the plurality of protection measures has been detected, and a sum of defense level values for protection measures that have not been attacked remaining on a partial route of the attack route extending between the attacked protection measure and the confidential information is less than the value expressed by the value information, the integrated circuit updates a protection measure that can be updated among the remaining protection measures on the partial route so that the sum of the defense level values on the partial route is greater than the value expressed by the value information. This enables preventing unauthorized acquisition and falsification of the confidential information by a third party.

Also, the management device that is one aspect of the present invention includes: a communication unit and a control unit. The control unit is connected to an electronic terminal that stores confidential information to be protected, stores a plurality of protection measures that are provided along an attack route extending from an external source to the stored confidential information and are operable to intercept an access from the external source to the confidential information via the attack route, and monitors for an attack to any of the plurality of protection measures from the external source. Upon receiving, from the electronic terminal, (i) value information expressing a value of the confidential information attached to the confidential information, (ii) a plurality of defense level information pieces each expressing a defense level value of a corresponding protection measure against an attack from the external source attached to each protection measure, and (iii) detection information indicating that an attack to any of the protection measures has been detected, the control unit of the management device is operable to judge whether a sum of defense level values for protection measures that have not been attacked remaining on a partial route of the attack route extending between the attacked protection measure and the confidential information is less than the value expressed by the value information, and when the judgment is affirmative, to update a protection measure that can be updated among the remaining protection measures on the partial route, so that the sum of the defense level values on the partial route is greater than the value expressed by the value information. The control unit is further operable to transmit a protection measure for updating to the electronic terminal. The electronic terminal, upon receiving the protection measure for updating from the management device, updates the protection measure that can be updated among the protection measures remaining on the partial route.

According to this structure, when an attack to any of the plurality of protection measures has been detected by the electronic terminal, and the sum of the defense level values for the protection measures remaining on the partial route is less than the value expressed by the value information, the management device transmits, to the electronic terminal, a protection measure for updating so that the sum of the defense level values on the partial route becomes greater than the value expressed by the value information. By doing this, since the electronic terminal updates the protection measure to be updated with the protection measure for updating received from the management device, the electronic terminal can protect the confidential information in a new protection state in which the existing protection measures have been strengthened. This enables preventing unauthorized acquisition and falsification of confidential information by a third party.

Also, the management device that is one aspect of the present invention includes: a communication unit and a control unit. The communication unit is connected to an electronic terminal that stores confidential information to be protected, stores a plurality of protection measures that are provided along an attack route extending from an external source to the stored confidential information and are operable to intercept an access from the external source to the confidential information via the attack route, and monitors for an attack to any of the plurality of protection measures from the external source. Upon receiving, from the electronic terminal, (i) value information expressing a value of the confidential information attached to the confidential information, (ii) a plurality of defense level information pieces each expressing a defense level value of a corresponding protection measure against an attack from the external source attached to each protection measure, and (iii) detection information, the control unit of the management device is operable to judge whether a sum of defense level values for protection measures that have not been attacked remaining on a partial route of the attack route extending between the attacked protection measure and the confidential information is less than the value expressed by the value information, and when the judgment is affirmative, to perform control to transmit, to the electronic terminal, a new protection measure such that the sum of the defense level values on the partial route is greater than the value expressed by the value information. The electronic terminal, upon receiving the new protection measure from the management device, adds the new protection measure to the partial route.

According to this structure, when an attack to any of the plurality of protection measures has been detected by the electronic terminal, and the sum of the defense level values for the protection measures remaining on the partial route is less than the value expressed by the value information, the management device transmits, to the electronic terminal, a new protection measure such that the sum of the defense level values on the partial route becomes greater than the value expressed by the value information. By doing this, since the electronic terminal adds the new protection measure received from the management device to the partial route, the electronic terminal can protect the confidential information in a new protection state having strengthened defenses on the partial route that has still not been attacked. This enables preventing unauthorized acquisition and falsification of confidential information by a third party.

Also, in a control method for a management device that is one aspect of the present invention, the management device is connected to an electronic terminal that stores confidential information to be protected, stores a plurality of protection measures that are provided along an attack route extending from an external source to the stored confidential information and are operable to intercept an access from the external source to the confidential information via the attack route, and monitors for an attack to any of the plurality of protection measures from the external source. The control method includes control for the management device to receive, from the electronic terminal, value information expressing a value of the confidential information attached to the confidential information, a plurality of defense level information pieces each expressing a defense level value of a corresponding protection measure against an attack from the external source attached to each protection measure, and detection information indicating that an attack to any of the protection measures has been detected. Upon receiving the value information, the plurality of defense level information pieces, and the detection information from the electronic terminal, the management device performs control to judge whether a sum of defense level values for protection measures that have not been attacked remaining on a partial route of the attack route extending between the attacked protection measure and the confidential information is less than the value expressed by the value information, and when the judgment is affirmative, to perform control to transmit, to the electronic terminal, a new protection measure such that the sum of the defense level values on the partial route is greater than the value expressed by the value information. The electronic terminal, upon receiving the new protection measure from the management device, updates the protection measure that can be updated with the protection measure for updating.

Also, a computer program that is one aspect of the present invention performs control on a management device connected to an electronic terminal that stores confidential information to be protected, stores a plurality of protection measures that are provided along an attack route extending from an external source to the stored confidential information and are operable to intercept an access from the external source to the confidential information via the attack route, and monitors for an attack to any of the plurality of protection measures from the external source. The computer program causes a computer of the management device to receive, from the electronic terminal, value information expressing a value of the confidential information attached to the confidential information, a plurality of defense level information pieces each expressing a defense level value of a corresponding protection measure against an attack from the external source attached to each protection measure, and detection information indicating that an attack to any of the protection measures has been detected. Upon receiving the value information, the defense level information pieces, and the detection information, the computer program causes the computer of the management device to judge whether a sum of defense level values for protection measures that have not been attacked remaining on a partial route of the attack route extending between the attacked protection measure and the confidential information is less than the value expressed by the value information, and when the judgment is affirmative, to perform control to cause the computer to transmit, to the electronic terminal, a new protection measure such that the sum of the defense level values on the partial route is greater than the value expressed by the value information. The electronic terminal, upon receiving the new protection measure from the management device, updates the protection measure that can be updated with the new protection measure for updating.

According to the above-described control method and computer program, the electronic terminal can protect the confidential information in a new protection state in which the existing protection measures have been strengthened, since when an attack to any of the plurality of protection measures has been detected, and a sum of defense level values for protection measures that have not been attacked remaining on a partial route of the attack route extending between the attacked protection measure and the confidential information is less than the value expressed by the value information, the electronic terminal updates a protection measure that can be updated among the remaining protection measures on the partial route so that the sum of the defense level values on the partial route is greater than the value expressed by the value information. This enables preventing unauthorized acquisition and falsification of the confidential information by a third party.

Also, an integrated circuit that is one aspect of the present invention is used in a management device that is connected to an electronic terminal that stores confidential information to be protected, stores a plurality of protection measures that are provided along an attack route extending from an external source to the stored confidential information and are operable to intercept an access from the external source to the confidential information via the attack route, and monitors for an attack to any of the plurality of protection measures from the external source. The management device performs control to receive, from the electronic terminal, value information expressing a value of the confidential information attached to the confidential information, a plurality of defense level information pieces each expressing a defense level value of a corresponding protection measure against an attack from the external source attached to each protection measure, and detection information indicating that an attack to any of the protection measures has been detected. Upon receiving the value information, the plurality of defense level information pieces, and the detection information, the management unit is operable to judge whether a sum of defense level values for protection measures that have not been attacked remaining on a partial route of the attack route extending between the attacked protection measure and the confidential information is less than the value expressed by the value information, and when the judgment is affirmative, and to perform control to transmit, to the electronic terminal, a new protection measure such that the sum of the defense level values on the partial route is greater than the value expressed by the value information. The electronic terminal, upon receiving the new protection measure from the management device, adds the new protection measure to the partial route.

According to this structure, when an attack to any of the plurality of protection measures has been detected by the electronic terminal, and the sum of the defense level values for the protection measures remaining on the partial route is less than the value expressed by the value information, the management device transmits, to the electronic terminal, a new protection measure such that the sum of the defense level values on the partial route becomes greater than the value expressed by the value information. By doing this, since the electronic terminal adds the new protection measure received from the management device to the partial route, the electronic terminal can protect the confidential information in a new protection state having strengthened defenses on the partial route that has still not been attacked. This enables preventing unauthorized acquisition and falsification of confidential information by a third party.

1. Embodiment 1

The following describes an unauthorized-analysis prevention system 1 pertaining to Embodiment 1 of the present invention with reference to the drawings.

1.1 Overview of the Unauthorized-Analysis Prevention System 1

FIG. 1 shows the main structure of the unauthorized-analysis prevention system 1 pertaining to Embodiment 1 of the present invention.

The unauthorized-analysis prevention system 1 includes a server 101 and electronic terminals 102a, ..., 102b, and the server 101 performs communication with the electronic terminals 102a, ..., 102b via a network 103.

Since the operations of the electronic terminals 102a, ..., 102b are the same, the following describes an electronic terminal 102 as an exemplary one of the electronic terminals 102a, ..., 102b.

The electronic terminal 102 is a computer system constituted from the constituent elements of a CPU, a RAM, a data reading device (drive device), and a network connection interface. The electronic terminal 102 stores therein property that is not to be released to a third party, and manages the property using a plurality of protection measures for protecting the property from unauthorized analysis by a third party.

Here, the property that is not to be released to a third party may include any of the following: a device ID or device key assigned to the electronic terminal 102, an authentication code or authentication program used for performing authentication between the CPU and the data reading device, and an authentication code or authentication program used for performing authentication between the electronic terminal 102 and a recording medium on which a computer program is recorded. Also, the property may include a control program for the electronic terminal 102, and/or programs of services etc. provided by the electronic terminal 102 to a user.

Also, the protection measures may include encryption of the property, code obfuscation, concealment of a debugger terminal, disabling the debugger, etc. A debugger terminal is used when operational tests, etc. are performed on the electronic terminal 102 prior to shipping, and is used when connecting a device that performs debugging (debugger device) to the electronic terminal 102. When the debugger device is connected to the electronic terminal 102, the debugger terminal performs authentication. For example, the debugger terminal may be located on a circuit board, and be concealed at the time of shipping in order to prevent users from using the debugger terminal after shipping.

The electronic terminal 102 monitors for attacks on the plurality of protection measures from external sources. Upon detecting an attack, the electronic terminal 102 generates detection information on the detected attack, and transmits the generated detection information to the server 101. If it is impossible to transmit the detection information to the server 101 at this time, the electronic terminal 102 stores the generated detection information in its own secure storage that can safely preserve the information. In this context, an attack is an action such as illicitly connecting an external source to a connection terminal that is not ordinarily connected to a device, illicitly analyzing information or data stored in the electronic terminal 102, etc. Also, a secure storage is a non-volatile memory or the like that is protected so that falsification is difficult, with use of tamper-resistant technology or the like.

Also, upon detecting an unauthorized attack, the electronic terminal 102 judges whether to add a new protection measure, and if the judgment is affirmative, transmits update request information indicating this judgment to the server 101.

Upon receiving the detection information from the electronic terminal 102, the server 101 stores the received detection information.

Also, upon receiving the update request information from the electronic terminal 102, the server 101 responds to the request by transmitting a protection measure (specifically a program, etc.) to the electronic terminal 102.

1.2 Structure of the Electronic Terminal 102

The following describes the structure of the electronic terminal 102.

Figure 2:
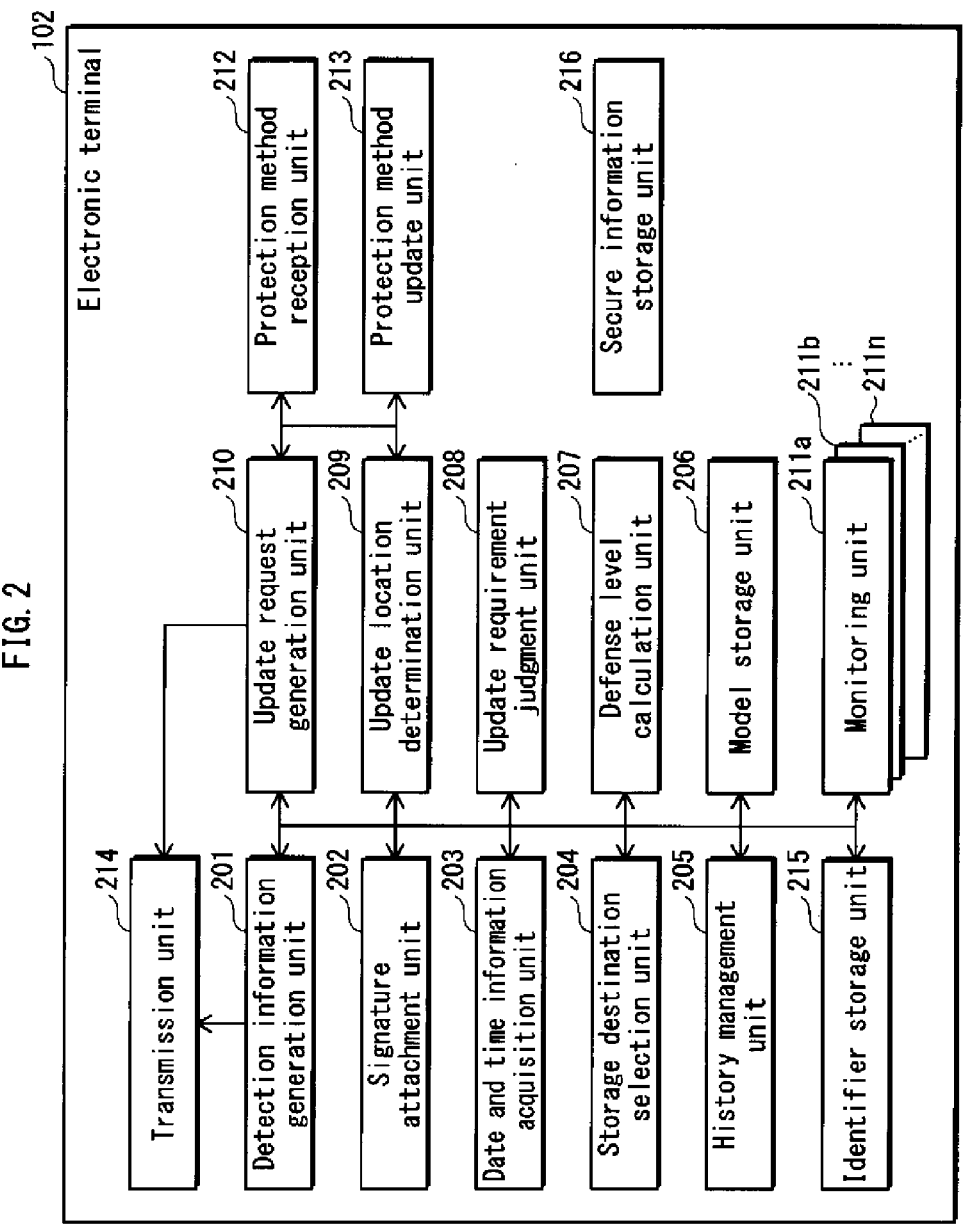
FIG. 2 shows a block diagram of the structure of the electronic terminal 102.

As shown in FIG. 2, the electronic terminal 102 includes a detection information generation unit 201, a signature attachment unit 202, a date and time information acquisition unit 203, a storage destination selection unit 204, a history management unit 205, a model storage unit 206, a defense level calculation unit 207, an update requirement judgment unit 208, an update location determination unit 209, an update request generation unit 210, monitoring units 211a, 211b, . . . , 211n, a protection method reception unit 212, a protection method update unit 213, a transmission unit 214, an identifier storage unit 215, and a secure information storage unit 216.

(1) Identifier Storage Unit 215

The identifier storage unit 215 stores an identifier for identifying the electronic terminal 102. Specifically, the server 101 assigns identifiers to each of the electronic terminals 102a, . . . , 102b, and the identifiers are for managing the terminals by the server 101. Hereinafter, the identifier assigned to the electronic terminal 102 is simply referred to as a "management ID".

(2) Secure Information Storage Unit 216

The secure information storage unit 216 is a secure storage that can safely preserve information therein.

The secure information storage unit 216 stores property that is not to be released to a third party so that the property is protected by one or more protection measures.

Also, for protection of the property, the secure information storage unit 216 stores another property (an associated property) that is associated with the property, and the associated property is also protected by one or more protection measures.

Hereinafter, information including the protected property and the protected associated property is referred to as secure information. Also, "confidential information" in the present invention refers to the property and the associated property. In addition to the protected property and the protected associated property, "secure information" also includes programs for decrypting processing, for example.

(3) Model Storage Unit 206

Figure 3:
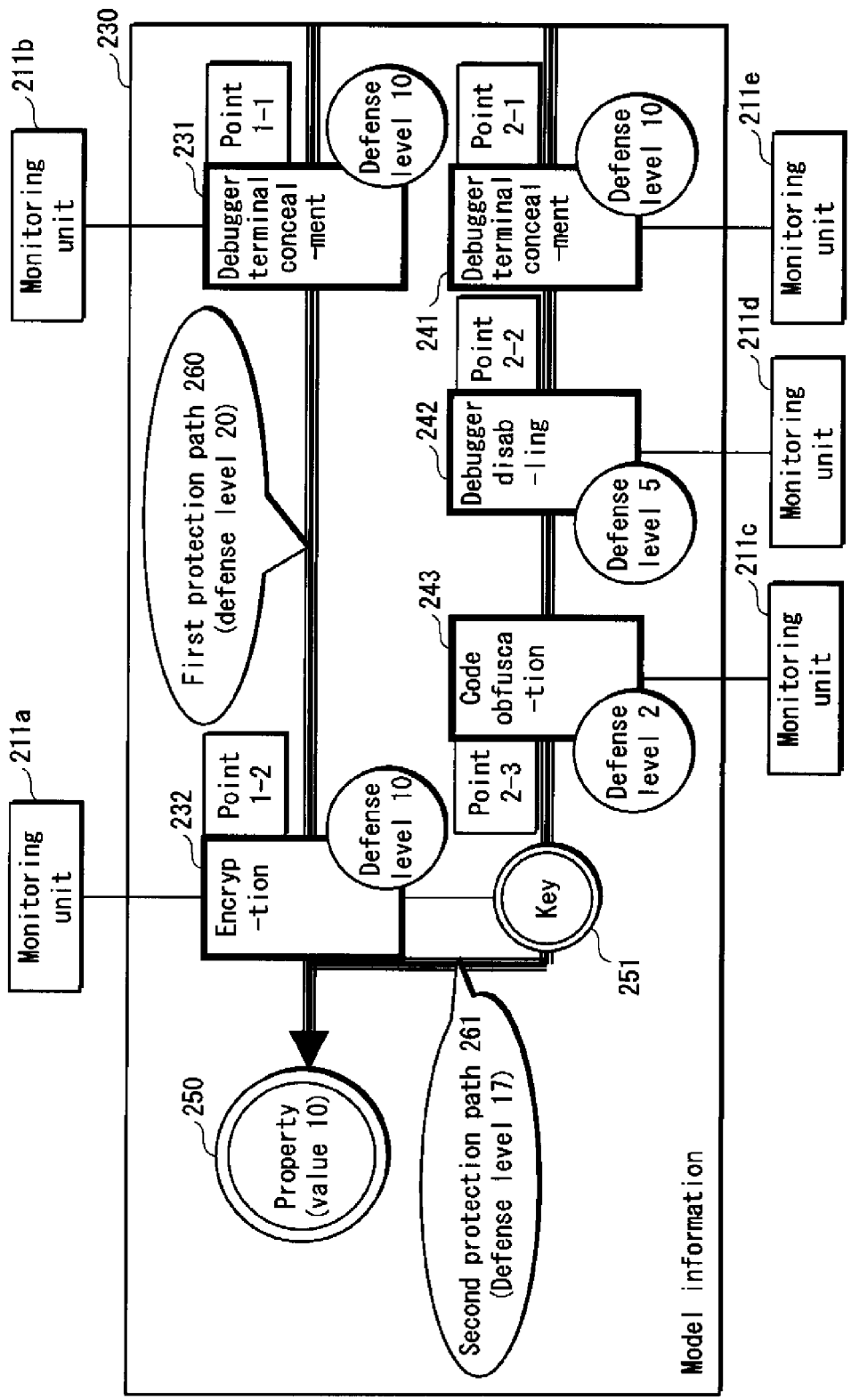
FIG. 3 shows the structure of model information 230.

As shown in FIG. 3, the model storage unit 206 stores therein security implementation model information (hereinafter referred to simply as model information) 230 indicating a structure of one or more protection measures in the electronic terminal 102.

More specifically, the model information 230 is information generated according to an order in which a person attempting unauthorized analysis would be likely to attack protection measures (specifically programs, etc.) to reach the protected property.

FIG. 3 shows the model information 230 in a case of preventing an attack from an unauthorized external source by using an encryption protection measure (hereinafter referred to as encryption) 232 on the protected property 250. The encryption protection measure is a decryption program for decrypting the encryption applied to the property 250.

The encrypted property 250 can be attacked according to either of the following two attack patterns.

One type of attack occurs when analysis or falsification of the encrypted property 250 is performed by connecting an analysis device such as a debugger device and directly attacking the encryption 232, that is, the encrypted property 250, or directly attacking a decryption program that decrypts the encryption (first attack pattern). The first attack pattern includes methods such as the "brute force method" of trying all possible candidates of keys, the "linear cryptanalysis" method of predicting keys, etc.

The other type of attack occurs when a key is acquired, analyzed, or falsified by connecting an analysis device such as a debugger device and attacking a key (decryption key) 251 that decrypts the encrypted property 250 (second attack pattern). Since the electronic terminal 102 is required to decrypt the encryption in order to use the encrypted property 250, the decryption key 251 is stored in the electronic terminal 102 in advance. Although acquiring this decryption key 251 does not enable the decryption program to be analyzed directly, it enables decrypting the property 250, and substantially disabling the protection by the protection measure 232. Therefore, it is conceivable for a third party to perform the second attack pattern. In view of this, a protection measure involving code obfuscation of the key 251 (hereinafter referred to simply as code obfuscation) 243 is used as a protection measure against the second attack pattern. Furthermore, a protection measure involving disabling debugging to prevent analysis of a code (key) that has been obfuscated (hereinafter referred to simply as debugger disabling) 242 is used. The debugger disabling 242 is a program that, for example, disables interrupt processing due to debugging. Here, the key 251 corresponds to the associated property described above. Also, the code obfuscation of the key 251 in the present embodiment refers to obfuscating a program for accessing the key 251 (for example, a decryption program for decrypting encrypted property with use of the key 251).

In other words, in the model information 230 shown in FIG. 3, a path of a first attack pattern (a first protection path 260) includes a protection measure of debugger terminal concealment (hereinafter referred to simply as debugger terminal concealment) 231 and the encryption 232 as the plurality of protection measures. Also, a path of a second attack pattern (a second protection path 261) includes debugger terminal concealment 241, debugger disabling 242, and code obfuscation 243.

Also, each protection measure has a corresponding defense level, and also has a corresponding protection identifier "Point x-y" for identifying the position on the protection path where the protection measure is located. In the example of the encryption 232, the defense level is "10", and the protection identifier is "Point 1-2".

Note that in the present embodiment, protection identifiers are also used in the model information 230 to identify each of the protection measures.

Also, the defense level is a marker indicating, for example, how much expense is required for analyzing a certain protection measure, the expense of the tools required, or the cost of employing an engineer to attack the protection measure. The defense level is calculated according to the following expression, for example.

Defense Level of Protection Measure=Cost of Tools+
(Hourly Wage of Engineer×Time Required for
Analysis)    Expression Also, the property 250 to be protected by the terminal 102 has a corresponding value (a property value, that is "10" in this case). The property value is calculated based on an amount of loss anticipated if the property is stolen, for example. This value is considered a marker by a similar rule as the defense level. When this value is expressed in a form that can be compared with the defense level, the result is the property value.

Here, as indicated by the model information 230, the electronic terminal 102 stores, in the secure information storage unit 216, secure information constituted from a property 250 protected by the encryption 232, and the key 251 protected by the code obfuscation 243.

(4) Monitoring Units 211*a*, 211*b*, . . . , 211*n*

The following describes the monitoring units 211*a*, 211*b*, . . . 211*n*.

Since the operations of the monitoring units 211*a*, 211*b* . . . , 211*n* are the same, the following describes a monitoring unit 211 as an exemplary one of the monitoring units 211*a*, 211*b* . . . , 211*n*.

The monitoring unit 211 is for monitoring a targeted protection measure, and is stored in a predetermined storage area in the electronic terminal 102.

The monitoring unit 211 pre-stores a protection identifier "Point x-y" for the targeted protection measure.

The monitoring unit 211 monitors whether the targeted protection measure has been attacked by an external source.

Upon judging that an attack has occurred, the monitoring unit 211 notifies this judgment and the protection identifier of the targeted protection measure to the detection information generation unit 201.

Specifically, the monitoring unit 211 monitors whether a device that should not be connected and that is equipped with an analysis tool such as a debugger is connected to the electronic terminal 102, whether a program implementing the protection measure has been illicitly rewritten, etc.

When monitoring the debugger terminal concealment 231 or 241, the monitoring unit 211 monitors whether the concealed debugger terminal has performed authentication with an external source. If the monitoring unit 211 determines that authentication with an external source has been performed, the monitoring unit 211 judges that an attack has occurred, and transmits a notification to this effect to the detection information generation unit 201 and the update requirement judgment unit 208.

Also, when monitoring the encryption 232, the debugger disabling 242, and the code obfuscation 243 respectively, the monitoring unit 211 monitors whether the programs of the monitored protection measures or the data thereof have been falsified. For example, the monitoring unit 211 pre-stores hash values corresponding to the targeted programs and the data thereof (for example, an encrypted property, an obfuscated key generation program or an obfuscated debugger-disabling program), periodically calculating hash values of monitored programs and data, and checking whether the calculated hash values match the stored hash values.

Also, the monitoring units 211*a*, 211*b*, . . . , and 211*n* may be configured to monitor each other.

Also, in the following description, when there is no need to distinguish between the monitoring units 211*a*, 211*b*, . . . , and 211*n*, an exemplary monitoring unit 211 is described.

(5) History Management Unit 205

The history management unit 205 includes a history management table T100 for recording information generated when the monitoring unit 211 detects an unauthorized attack, the information conveying facts about the attack.

Figures 4, 5:
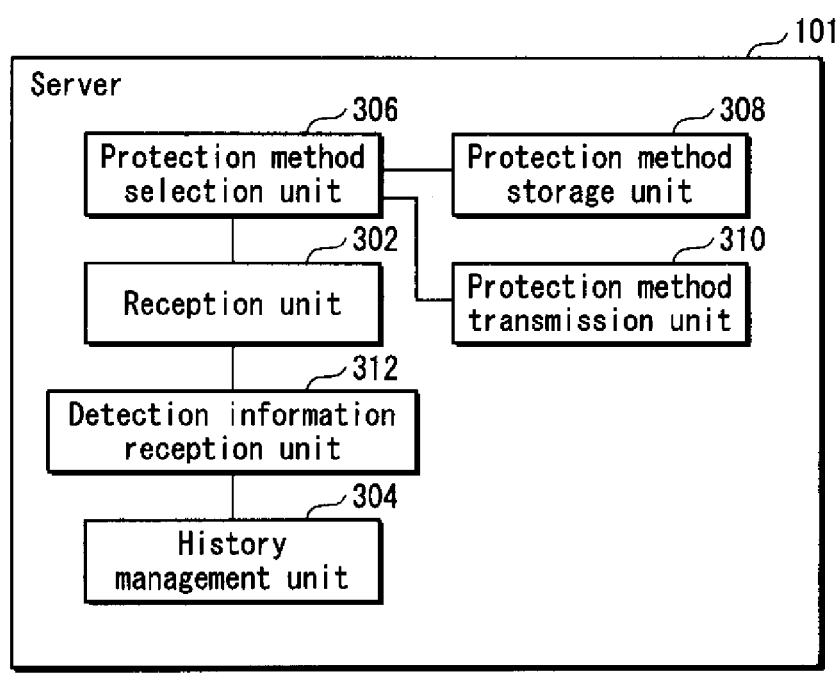
FIG. 4 shows an exemplary data structure of a history management table T100.
FIG. 5 is a block diagram showing the structure of the server 101.

As shown in FIG. 4, the history management table T100 includes areas for storing at least one information set each composed of a transmission flag, a date and time, and a protection identifier.

The transmission flag is information indicating whether information conveying facts about the attack has already been transmitted to the server 101. A value "0" indicates that the information has not yet been transmitted, and a value "1" indicates that the information has been transmitted.

The date and time is the date and time at which the monitoring unit 211 detected an attack. The protection identifier is an identifier of the protection measure to be monitored by the monitoring unit 211.

(6) Detection Information Generation Unit 201

Upon receiving a notification that an attack has occurred from the monitoring unit 211, the detection information generation unit 201 outputs a date and time acquisition instruction to the date and time information acquisition unit 203 in order to acquire the present date and time.

Upon receiving date and time information indicating the present date and time from the date and time information acquisition unit 203, the detection information generation unit 201 generates detection information including the date and time information and the protection identifier of the monitored protection measure.

The detection information generation unit 201 transmits, to the storage destination selection unit 204, a transmission judgment instruction to perform a judgment as to whether the generated detection information can be transmitted to the server 101.

Upon receiving transmission incapability information from the storage destination selection unit 204 indicating that transmission to the server 101 is impossible, the detection information generation unit 201 sets the transmission flag to the value "0". The detection information generation unit 201 stores the generated detection information in correspondence with the transmission flag that has been set to the value "0" in the history management unit 205.

Upon receiving transmission capability information indicating that transmission to the server 101 is possible, the detection information generation unit 201 acquires all of the detection information that is stored in the history management unit 205 and has not been transmitted to the server 101

(untransmitted detection information). Specifically, the detection information generation unit 201 acquires all of the detection information for which the value of the transmission flag is "0".

The detection information generation unit 201 outputs the generated detection information and the untransmitted detection information to the signature attachment unit 202 so that signature data can be attached to the generated detection information and all of the acquired untransmitted detection information. Upon receiving back the detection information and the untransmitted detection information with the signature data attached thereto, the detection information generation unit 201 acquires the management ID from the identifier storage unit 215.

The detection information generation unit 201 transmits the detection information and the untransmitted detection information, with the attached signature data, and the management ID to the server 101 via the transmission unit 214. When the transmission is complete, the detection information generation unit 201 changes the value of the transmission flag of the untransmitted detection information stored in the history management unit 205 from "0" to "1".

Note that when untransmitted detection information does not exist in the history management unit 205, the detection information generation unit 201 outputs only the generated detection information to the signature attachment unit 202. The detection information generation unit 201 receives only the detection information having attached signature data from the signature attachment unit 202, and transmits only the received detection information having the attached signature data to the server 101.

The detection information generation unit 201 acquires all of the protection identifiers included in the transmitted detection information and the untransmitted detection information. The detection information generation unit 201 outputs all of the acquired protection identifiers and update requirement judgment instructions to the update requirement judgment unit 208.

(7) Signature Attachment Unit 202

The signature attachment unit 202 attaches, to the detection information, signature data for certifying that the detection information was generated by the electronic terminal 102. It can be seen by verifying this signature data that the detection information was generated by the electronic terminal 102. Note that hereinafter, checking whether the detection information was generated by the electronic terminal 102 is referred to as checking the authenticity of the detection information, or checking the authenticity of the transmission source of the detection information.

The following describes the specific operations of the signature attachment unit 202.

The signature attachment unit 202 pre-stores a secret key (SK) used for generating the signature data.

Upon receiving one or more piece of detection information from the detection information generation unit 201, the signature attachment unit 202 generates signature data for all of the received detection information using the secret key (SK). Since known digital signature technology may be used for generating the signature data, a detailed description of the generation procedure is omitted. The signature attachment unit 202 attaches the generated signature data to the detection information targeted for signature, and outputs, to the detection information generation unit 201, the detection information with the signature data attached.

By verifying this signature data, the server 101 can check the authenticity of the transmission source of the detection information.

(8) Date and Time Information Acquisition Unit 203

The date and time information acquisition unit 203 includes a clock function that outputs the date and time.

Upon receiving the date and time acquisition instruction from the detection information generation unit 201, the date and time information acquisition unit 203 acquires date and time information indicating the current time with the clock function, and outputs the acquired date and time information to the detection information generation unit 201.

Note that it is preferable for the date and time information to be implemented in such a way that unauthorized analysis is impossible.

(9) Storage Destination Selection Unit 204

The storage destination selection unit 204 selects whether to transmit the detection information to the server 101 to be stored, or to store the detection information in the history management unit 205, and notifies the result of the selection to the detection information generation unit 201.

The following describes the specific operations of the storage destination selection unit 204.

The storage destination selection unit 204 judges whether there is a network connection.

When a judgment is made that there is not a network connection, that is, when it is judged that transmission cannot be performed with the server 101, the storage destination selection unit 204 outputs the transmission incapability information to the detection information generation unit 201.

When a judgment is made that there is a network connection, that is, when it is judged that transmission can be performed with the server 101, the storage destination selection unit 204 outputs the transmission capability information to the detection information generation unit 201.

(10) Update Requirement Judgment Unit 208

Upon receiving an update requirement judgment instruction and one or more protection identifiers from the detection information generation unit 201, the update requirement judgment unit 208 outputs, to the defense level calculation unit 207, each of the received protection identifiers and a calculation instruction instructing calculation of a defense level.

Upon receiving one or more defense levels calculated by the defense level calculation unit 207, the update requirement judgment unit 208 acquires a value of the protected property 250 from the model information 230 recorded in the model storage unit 206. The update requirement judgment unit 208 compares each of the acquired values with each of the received defense levels. Note that each of the defense levels calculated by the defense level calculation unit 207 indicate a defense level of a path to the respective property passed by someone attempting unauthorized analysis. The details thereof are described later.

If the result of the comparison is that the defense level of one or more paths is less than or equal to the value of the property 250, the update requirement judgment unit 208 judges that an update is required.

The update requirement judgment unit 208 outputs, to the update location determination unit 209, an update location determination instruction instructing the determination of an update location, and one or more protection identifiers received from the detection information generation unit 201.

(11) Defense Level Calculation Unit 207

The defense level calculation unit 207 receives a calculation instruction and one or more protection identifiers from the update requirement judgment unit 208.

The defense level calculation unit 207 acquires, from among the protection paths that could be passed by someone attempting to reach the protected property, all protection paths including one or more protection measures that corresponds to the one or more received protection identifiers.

The defense level calculation unit 207 calculates a defense level pertaining to the strength of security for all of the acquired protection paths, excluding any protection measure to which an attack has been detected.

The defense level calculation unit 207 outputs the calculated defense level of each of the acquired protection paths to the update requirement judgment unit 208.

The defense level of a protection path in this context can be expressed as the sum of all of the defense levels for each of the protection measures on the protection path. For example, the defense level of the protection path when there are three protection measures in the protection path is calculated as follows.

> Defense Level of Protection Path=Defense Level of First Protection Measure+Defense Level of Second Protection Measure+Defense Level of Third Protection Measure Specifically, in FIG. 3, before an attack is detected, the defense levels of the first protection path 260 and the second protection path 261 are, respectively, "20" (the sum of the defense level "10" of the debugger terminal concealment 231 and the defense level "10" of the encryption 232), and "17" (the sum of the defense level "10" of the debugger terminal concealment 241, the defense level "5" of the debugger disabling 242, and the defense level "2" of the code obfuscation 243).

Also, upon receiving a calculation instruction and a protection identifier "Point 2-1" from the update requirement judgment unit 208, the defense level calculation unit 207 can determine that the protection measure identified by the protection identifier "Point 2-1" has been attacked. For this reason, the defense level calculation unit 207 calculates the defense level "7", as the defense level of the second protection path 261 after the attack is detected, by calculating the sum of the other protection measures besides the debugger terminal concealment 241 that corresponds to the protection identifier "Point 2-1" in the second protection path 261.

(12) Update Location Determination Unit 209

Upon receiving the update location determination instruction and one or more protection identifiers from the update requirement judgment unit 208, the update location determination unit 209 determines, based on a security implementation model of the security state after the attack, one or more locations requiring an update (hereinafter referred to as update locations), and a defense level required for each update location.

The update location determination unit 209 outputs the one or more determined update locations and the defense level required for each update location to the update request generation unit 210.

As an update location, the update location determination unit 209 selects an effective location for defense against an attack from an external source, either by adding a new protection measure, or updating (strengthening the defense level of) an existing protection measure. In general, a location is selected that is closer to the protected property than the attacked location (location where the attack was detected) is. That is to say, an effective location is selected on the portion of the path from the location where the attack was detected to the protected property. The reason for this is that if a new protection measure is added over the protection measure that has already been broken, the attacker is likely to bypass the new protection measure and perform a direct attack from the broken protection measure. Note that a plurality of locations may be selected as update locations. Also, updating the existing protection measure means, for example, if the existing protection measure is an encryption program, changing the encryption program to a stronger encryption program.

Also, the update location determination unit 209 determines (calculates) a defense level for the new protection measure so that the defense level of the protection path to include the new protection measure is greater than the property value.

The update location determination is realized by, for example, specifying a protection identifier of one or more protection measures adjacent to the update location. For example, when one protection identifier is specified, the location to be updated is between the protection measure corresponding to the one specified protection identifier and the protected property, for example. Also, when two protection identifiers are specified, the location to be updated is between the two protection measures corresponding respectively to the two specified protection identifiers.

(13) Update Request Generation Unit 210

Upon receiving one or more determined update locations and a defense level required for each location from the update location determination unit 209, the update request generation unit 210 acquires a management ID from the identifier storage unit 215.

The update request generation unit 210 generates update request information constituted from the acquired management ID, the received one or more update locations, and the one or more defense levels corresponding to the one or more update locations, and transmits the generated update request information to the server 101 via the transmission unit 214.

(14) Transmission Unit 214

Upon receiving the detection information and untransmitted detection information with attached signature data and the management ID from the detection information generation unit 201, the transmission unit 214 transmits the received detection information and the untransmitted detection information with signature data attached and the management ID to the server 101 via the network 103.

Upon receiving the update request information from the update request generation unit 210, the transmission unit 214 transmits the update request information to the server 101 via the network 103.

(15) Protection Method Reception Unit 212

The protection method reception unit 212 receives one or more protection measures determined based on the transmitted update request information, and a new monitoring unit corresponding to each of the one or more protection measures, from the server 101 via the network 103.

Specifically, the protection method reception unit 212 receives new secure information pertaining to a new protection measure applied to the protected property 250 or the key 251, new model information indicating the secure information, and one or more new monitoring units, from the server 101.

In this context, the new secure information pertaining to the new applied protection measure is either secure information pertaining to a newly added protection measure, or secure information pertaining to a new protection measure that replaces an existing protection measure and that has a stronger defense level than the existing protection measure. A case of a newly added protection measure occurs when, for example, encryption is added as the new protection measure between the code obfuscation 243 and the debugger disabling 242 on the second protection path 261. Also, a case of replacing an existing protection measure with a new protection measure that has a stronger defense level than the existing protection measure occurs when, for example, the encryption 232 (defense level 10) of the first protection path 260 is replaced with an encryption having a higher defense level than 10 (for example, defense level 12) as a new protection measure.

Note that when the new protection measure is encryption, information included in the secure information may include a key, or a program for decryption processing, that is associated information for decrypting the encryption.

(16) Protection Method Update Unit 213

The protection method update unit 213 replaces, that is to say updates, secure information currently stored in a secure storage (the secure information storage unit 216) with new secure information received by the protection method reception unit 212.

The protection method update unit 213 replaces, that is to say updates, model information 230 stored in the current model storage unit 206 with the new model information received by the protection method reception unit 212.

Also, in order to monitor the one or more new protection measures, the protection method update unit 213 stores the received one or more monitoring units in a predetermined storage area in the electronic terminal 102.

Note that if a program for decryption processing of secure information is included, the program is stored in the predetermined area.

1.3 Server 101

The following describes the structure of the server 101.

As shown in FIG. 5, the server 101 includes a reception unit 302, a history management unit 304, a protection method selection unit 306, a protection method storage unit 308, a protection method delivery unit 310, and a detection information reception unit 312.

(1) Reception Unit 302

Upon receiving one or more pieces of detection information with attached signature information and the management ID from the electronic terminal 102 via the network 103, the reception unit 302 outputs the received one or more pieces of detection information with attached signature information and the management ID to the detection information reception unit 312.

Upon receiving the update request information from the electronic terminal 102 via the network 103, the reception unit 302 outputs the received update request information to the protection method selection unit 306.

(2) Detection Information Reception Unit 312

A public key (PK) corresponding to the secret key (SK) stored in the electronic terminal 102 is correlated to the management ID of the electronic terminal 102, and stored in advance.

Upon receiving the one or more detection information pieces with signature data attached and the management ID from the reception unit 302, the detection information reception unit 312 acquires a public key (PK) corresponding to the received management ID.

The detection information reception unit 312 verifies the signature data corresponding to the one or more received detection information pieces with use of the acquired public key. Note that since signature verification is known technology, description thereof is omitted here.

If the received one or more detection information pieces are judged to be transmitted from the electronic terminal 102 as a result of the signature verification, the detection information reception unit 312 stores the received one or more detection information pieces in correspondence with the received management ID in the history management unit 304.

(3) History Management Unit 304

The history management unit 304 includes a history management table T200 having recorded therein detection information transmitted from the electronic terminal 102.

As shown in FIG. 6, the history management table T200 includes an area for storing at least one set constituted from a management ID, a date and time, and a protection identifier.

The management ID is a management ID for identifying the electronic terminal 102 that transmitted the detection information.

The date and time is the date and time at which the electronic terminal 102 corresponding to the management ID detected an attack. The protection identifier is an identifier of the protection measure to which the attack has been detected.

(4) Protection Method Storage Unit 308

The protection method storage unit 308 stores protection methods that can be used in the electronic terminal 102.

The following describes a specific example.

The protection method storage unit 308 stores a plurality of types of model information, each having a different protection pattern by which the electronic terminal 102 protects the protected property 250. Note that each piece of model information includes a model identifier for identifying the model information piece, and a secure information piece protected by the model indicated by the model information, in correspondence with each other.

For example, the model information stored in the protection method storage unit 308 includes the model information 230 shown in FIG. 3, model information pertaining to an encryption that protects the property 250 and is different from the encryption 232 indicated by the model information 230, model information pertaining to a protection measure existing between the code obfuscation 243 and the debugger disabling 242 indicated by the model information 230, etc.

Also, for each of the protection measures, the protection method storage unit 308 stores a corresponding monitoring unit for monitoring the protection measure.

(5) Protection Method Selection Unit 306

Upon receiving the update request information from the reception unit 302, the protection method selection unit 306 selects a protection method and one or more monitoring units appropriate for transmitting from the protection method storage unit 308 to the electronic terminal 102, the selection being based on the one or more locations requiring an update and the defense level required for each update location included in the received update request information.

The following describes a specific example.

The protection method selection unit 306 stores the model identifiers corresponding to the model information stored in the electronic terminal 102, in correspondence with the management ID of the electronic terminal 102, in a secure storage area.

Upon receiving the update request information from the reception unit 302, the protection method selection unit 306 acquires the management ID included in the received update request information, and acquires a model identifier corresponding to the acquired management ID from the secure memory area.

The protection method selection unit 306 acquires model information corresponding to the acquired model identifier from the protection method storage unit 308. Based on the acquired model information, the one or more locations requiring an update included in the received update request information, and the defense level required for each of the locations requiring an update, the protection method selection unit 306 acquires the new model information, in addition to a new model identifier and new security information corresponding to the new model information, from the protection method storage unit 308. Note that the new secure information acquired at this time is either secure information pertaining to a new protection measure added at the update location, or secure information pertaining to a new protection measure that replaces an existing protection measure located at the update location, and that has a stronger defense level than the existing, protection measure.

The protection measure selection unit 306 acquires one or more new monitoring units corresponding respectively to the one or more new protection measures included in the new acquired secure information.

The protection method selection unit 306 transmits the acquired new model information, the new secure information, and the one or more monitoring units to the electronic terminal 102 pertaining to the update request, via the protection method delivery unit 310.

The protection method selection unit 306 replaces, that is to say updates, the model identifier corresponding to the management ID of the electronic terminal 102 that is the transmission destination currently stored in the secure storage unit with the model identifier corresponding to the acquired new model information.

Note that it is preferable for the update to be performed in such a manner that there can be no roll-back, that is return, to previous secure information. Specifically, this is realized by such a method as version management.

(6) Protection Method Delivery Unit 310

Upon receiving new model information and new secure information from the protection method selection unit 306, the protection method delivery unit 310 transmits the received new model information and the new secure information to the electronic terminal 102 pertaining to the update request, via the network 103.

Note that when the new protection measure is encryption, a program for decryption processing is included in the secure information that is sent.

1.4 Operations of the Electronic Terminal 102

Figure 7:
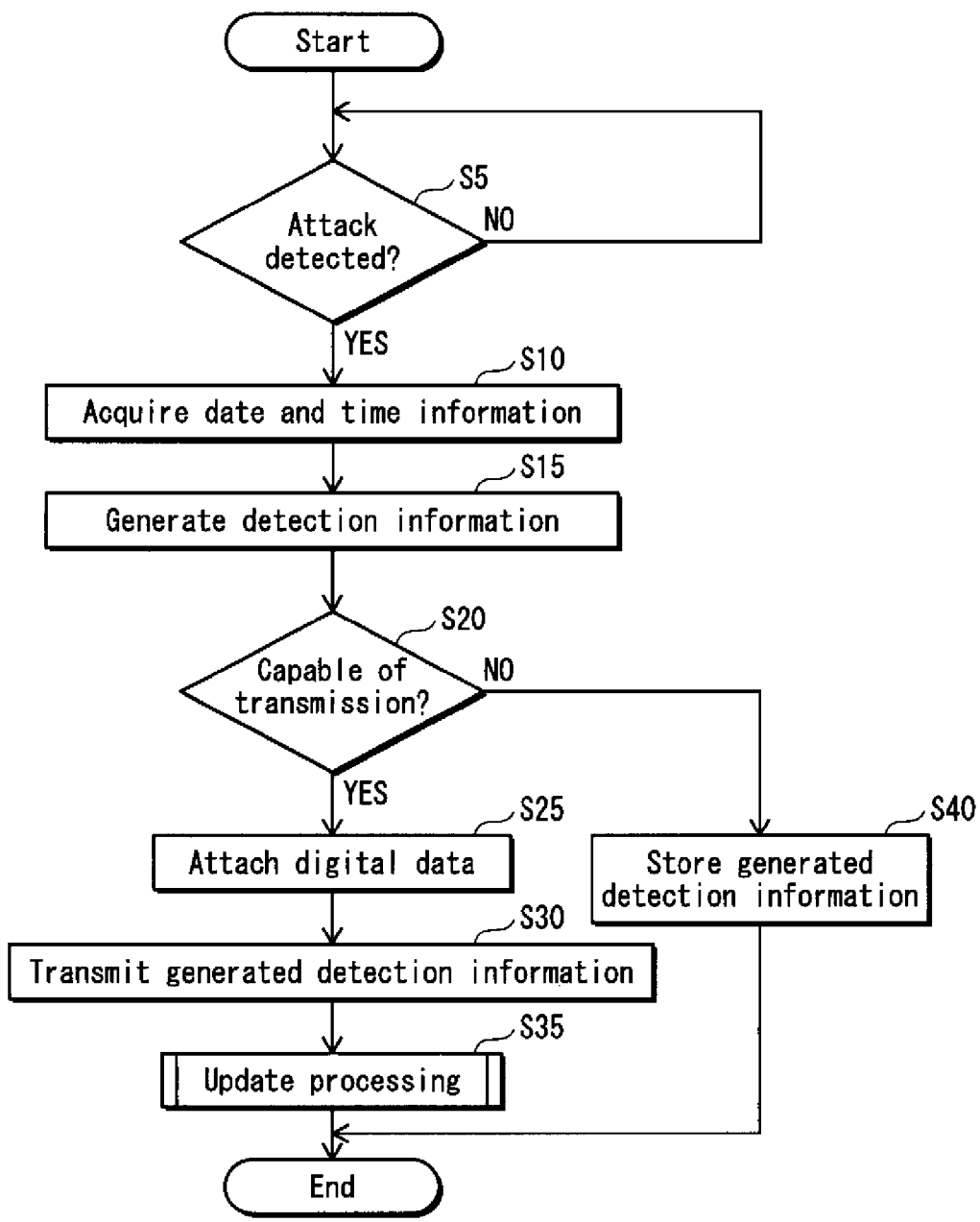
FIG. 7 is a flowchart showing operations by the electronic terminal 102 when monitoring against an attack from an external source.

The following describes operations of the electronic terminal 102 while monitoring for an attack from an external source, with reference to the flowchart shown in FIG. 7.

(1) Overall Operations

The electronic terminal 102, with use of the monitoring unit 211, monitors whether the protection measure being monitored has been attacked by an external source (step S5).

When a judgment is made that an attack has occurred ("YES" in step S5), the electronic terminal 102, with use of the date and time information acquisition unit 203, acquires date and time information indicating the current date and time (step S10).

The electronic terminal 102, with use of the detection information generation unit 201, generates detection information including the acquired date and time information and the protection identifier corresponding to the protection method that has been attacked (step S15).

The electronic terminal 102, with use of the storage destination selection unit 204, judges whether the generated detection information can be transmitted to the server 101 (step S20). Specifically, the electronic terminal 102, with use of the storage destination selection unit 204, judges whether there is a network connection.

When transmission is judged to be possible ("YES" in step S20), the electronic terminal 102, with use of the signature attachment unit 202, attaches signature data to the generated detection information (step S25). The electronic terminal 102, with use of the detection information generation unit 201, transmits the detection information with attached signature data and the management ID to the server 101 (step S30). At this time, if untransmitted detection information exists, the signature attachment unit 202 attaches the signature data to the generated detection information and all of the untransmitted detection information. The detection information generation unit 201 transmits all of the detection information and the untransmitted detection information with the signature data attached, along with the management ID, to the server 101. Note that when no untransmitted detection information exists, the signature attachment unit 202 attaches signature data to the generated detection information only, and the detection information generation unit 201 transmits the detection information with the signature data attached and the management ID to the server 101.

Upon transmitting the detection information to the server 101, the electronic terminal 102 judges whether an update is required, using update processing described later. If an update is judged to be required, the electronic terminal 102 receives new secure information from the server 101, and updates the secure information currently stored with new secure information (step S35).

When transmission is judged to be impossible ("NO" in step S20), the electronic terminal 102, with use of the detection information generation unit 201, sets the transmission flag to the value "0". Then the electronic terminal 102, with use of the detection information generation unit 201, stores the transmission flag set with the value "0" in correspondence with the generated detection information in the history management unit 205 (step S40).

(2) Update Processing

Figure 8:
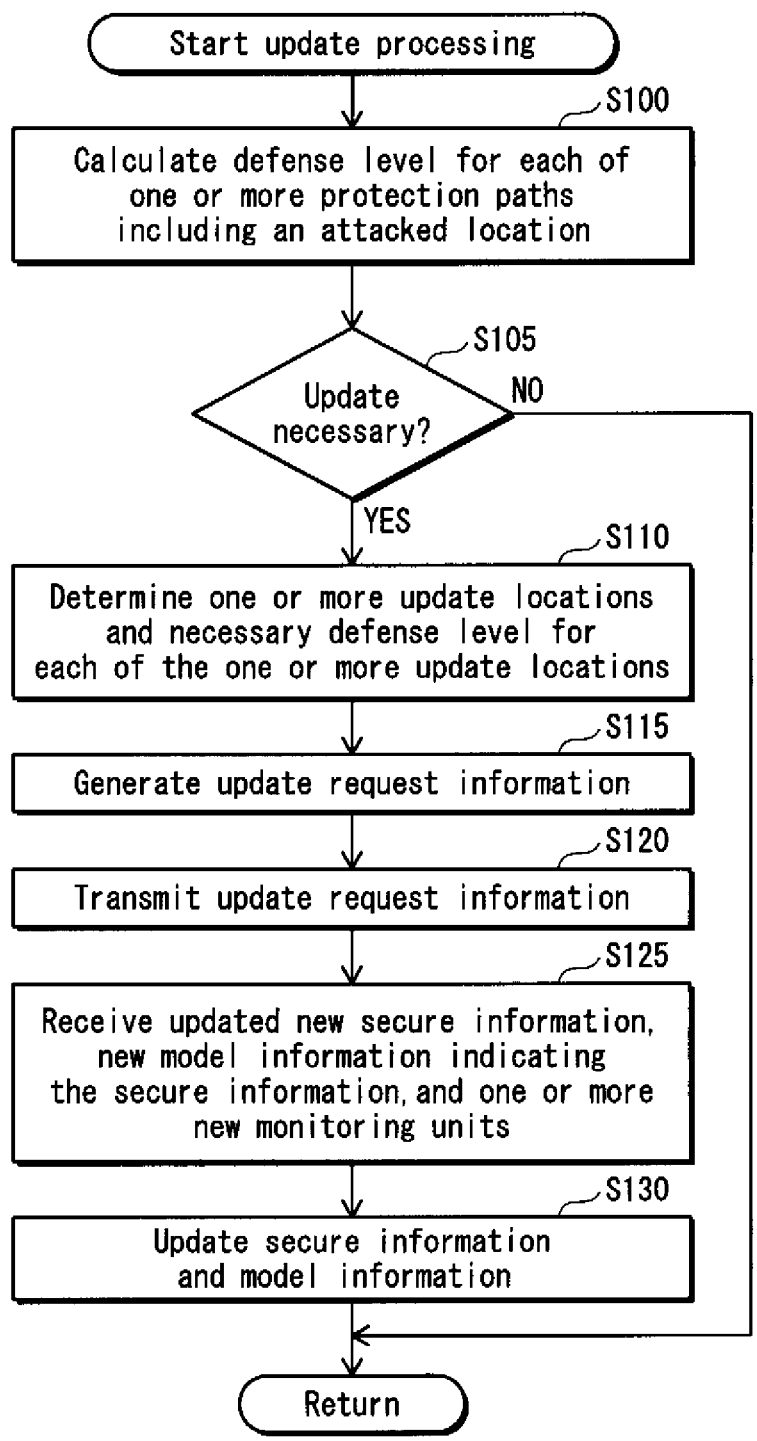
FIG. 8 is a flowchart showing operations for update processing.

The following describes the operations of the update processing performed in step S35 of FIG. 7, with reference to the flowchart shown in FIG. 8. Note that FIG. 8 shows the details of the update processing of step S35 in FIG. 7.

The electronic terminal 102, with use of the defense level calculation unit 207, calculates a defense level pertaining to a security strength for each protection path including one or more protection measures that have been attacked, excluding the protection measure to which the attack has been detected (step S100).

The electronic terminal 102, with use of the update requirement determination unit 208, judges whether an update is required by comparing each of the defense levels calculated by the defense level calculation unit 207 to the value of the protected property 250 (step S105).

When an update is judged to be required ("YES" in step S105), the electronic terminal 102, with use of the update location determination unit 209, determines one or more locations requiring an update, and a defense level required for each of the one or more update locations, based on a security implementation model of the security state after the attack (step S110).

The electronic terminal 102, with use of the update request generation unit 210, generates update request information constituted from the one or more update locations determined by the update location determination unit 209, the required defense level, and the management ID (step S115), and transmits the generated update request information to the server 101 (step S120).

The electronic terminal 102, with use of the protection method reception unit 212, receives, from the server 101, the new secure information determined based on the transmitted update request information, new model information indicating the secure information, and one or more new monitoring units (step S125).

The electronic terminal 102, with use of the protection method update unit 213, updates the secure information currently stored in the secure storage (the secure information storage unit 216) with the new secure information received by the protection method reception unit 212. Also, the electronic terminal 102, with use of the protection method update unit 213, updates the model information 230 stored in the current model storage unit 206 with the new model information received by the protection method reception unit 212 (step S130). Also, to monitor the one or more new protection measures included in the new secure information, the electronic terminal 102 stores the received one or more monitoring units in a predetermined storage area of the electronic terminal 102, with use of the protection method update unit 213.

When a judgment is made that an update is not required ("NO" in step S105), the electronic terminal 102 ends the processing.

1.5 Operations of the Server 101

Figure 9:
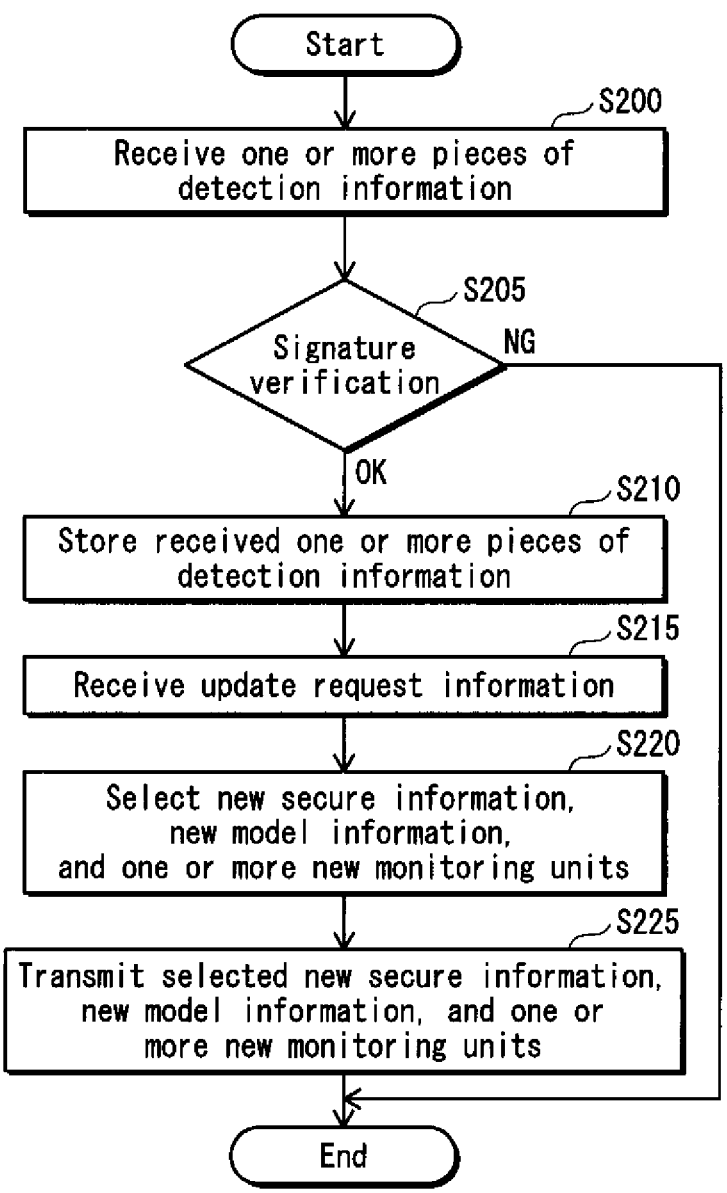
FIG. 9 is a flowchart showing operations of the server 101.

The following describes the operations of the server 101 with reference to the flowchart in FIG. 9.

The server 101, with use of the detection information reception unit 312, receives one or more detection information pieces with attached signature data and the management ID from the electronic terminal 102 (step S200).

The server 101, with use of the detection information reception unit 312, verifies the signature of the received detection information (step S205).

If the authenticity of the received detection information is confirmed by the signature verification ("OK" in step S205), the server 101, with use of the detection information reception unit 312, stores the received one or more detection information pieces, in correspondence with the received management ID, in the history management unit 304 (step S210).

Upon receiving the update request information from the electronic terminal 102 (step S215), the server 101, with use of the protection method selection unit 306, selects new secure information, new model information corresponding to the new secure information, and one or more monitoring units appropriate for transmitting from the protection method storage unit 308 to the electronic terminal 102, based on the location requiring an update and the defense level required for the location included in the received update request information (step S220).

The server 101, with use of the protection method delivery unit 310, transmits the new model information, new secure information, and one or more new monitoring units selected by the protection method selection unit 306, to the electronic terminal 102 pertaining to the update request (step S225).

At this time, with use of the protection method selection unit 306, the server 101 performs an operation to update the model identifier corresponding to the management ID of the electronic terminal 102 that is the transmission destination currently stored in the secure storage area, with a model identifier corresponding to the acquired new model information.

Also, when the received detection information is judged to be unauthentic as a result of the signature verification ("NG" in step S205), the server 101 ends the processing.

2. Embodiment 2

Embodiment 2 differs from Embodiment 1 in that when an attack is detected, the processing such as calculating the defense levels and determining the update locations is performed by the server.

The following describes the structures and operations of each device.

2.1 Overview of an Unauthorized-Analysis Prevention System 2

Figure 10:
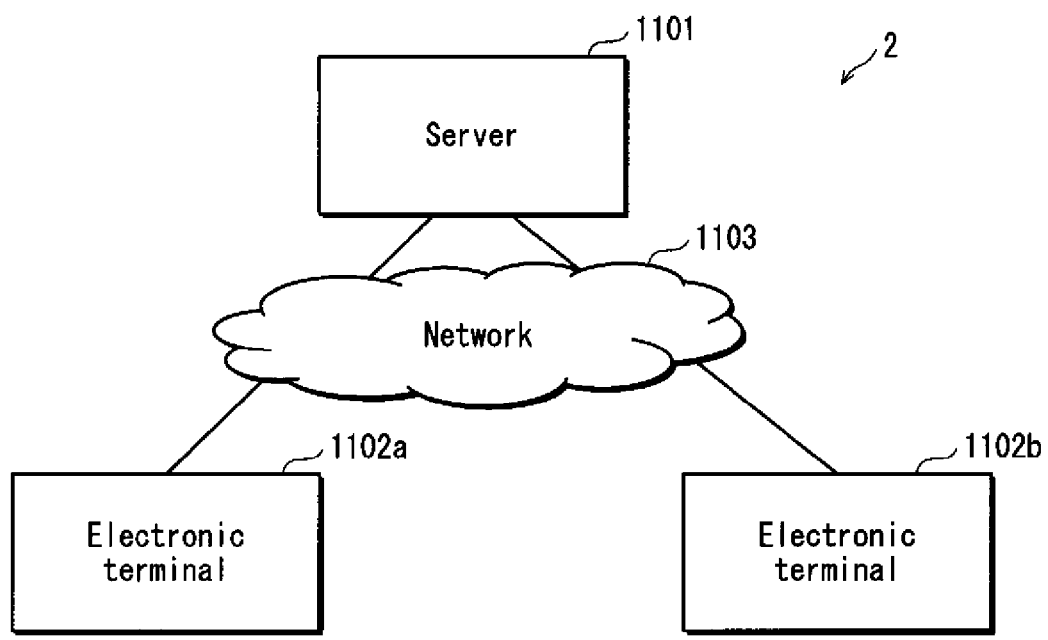
FIG. 10 shows a main structure of an unauthorized-analysis prevention system 2.

FIG. 10 shows an overall structure of the unauthorized-analysis prevention system 2 of Embodiment 2 of the present invention.

The unauthorized-analysis prevention system 2 includes a server 1101 and electronic terminals 1102*a*, . . . , 1102*b*, and the server 1101 performs communication with the electronic terminals 1102*a*, . . . , 1102*b* via a network 1103.

Since the operations of the electronic terminals 1102*a*, . . . , 1102*b* are the same, the following describes an electronic terminal 1102 as an exemplary one of the electronic terminals 1102*a*, . . . , 1102*b*.

Similarly to Embodiment 1, the electronic terminal 1102 stores a property that is not to be released to a third party, and manages the property with use of a plurality of protection measures.

The electronic terminal 1102 monitors against an unauthorized attack by an external source on the plurality of protection measures. If an unauthorized attack is detected, the electronic terminal 1102 generates detection information to that effect, and transmits the generated detection information to the server 1101. At this time, if transmission cannot be performed to the server 1101, the electronic terminal 1102 stores the generated detection information in its own secure storage that can safely preserve the information.

Upon receiving the detection information from the electronic terminal 1102, the server 1101 stores the received detection information.

Furthermore, upon receiving the detection information, the server 1101 judges whether to add a new protection measure. When the judgment is affirmative, the server 1101 determines an update location and calculates a required defense level, and transmits new secure information based on the determined update location and defense level to the electronic terminal 1102 to which the attack was detected.

2.2 Structure of the Electronic Terminal 1102

The following describes the structure of the electronic terminal 1102.

Figure 11:
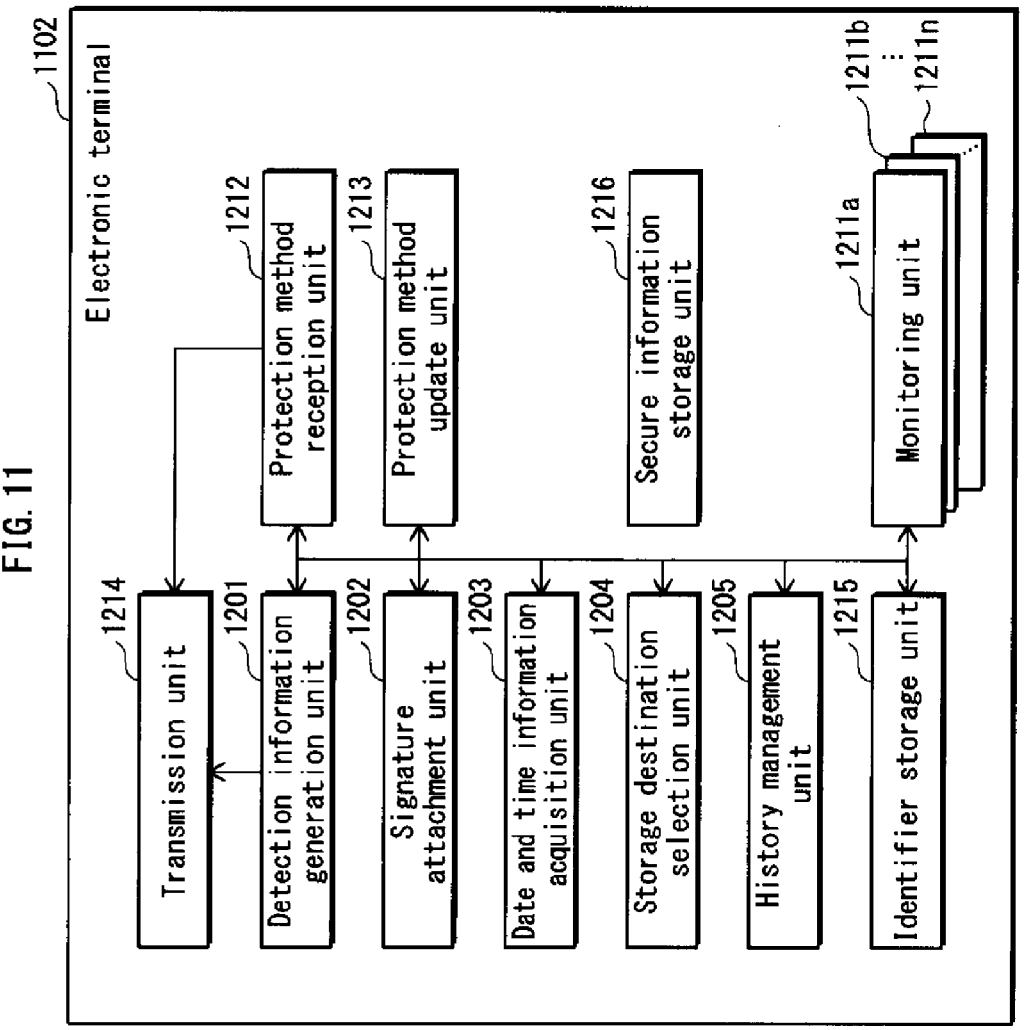
FIG. 11 is a block diagram showing the structure of the electronic terminal 1102.

As shown in FIG. 11, the electronic terminal 1102 includes a detection information generation unit 1201, a signature attachment unit 1202, a date and time information acquisition unit 1203, a storage destination selection unit 1204, a history management unit 1205, monitoring units 1211*a*, 1211*b*, . . . , 1211*n*, a protection method reception unit 1212, a protection method update unit 1213, a transmission unit 1214, an identifier storage unit 1215, and a secure information storage unit 1216.

(1) Identifier Storage Unit 1215

The identifier storage unit 1215 stores a management ID for identifying the electronic terminal 1102.

(2) Secure Information Storage Unit 1216

Since the secure information storage unit 1216 is similar to the secure information storage unit 216 described in Embodiment 1, description thereof is omitted here.

(3) Monitoring Units 1211*a*, 1211*b*, 1211*n*

The following describes the monitoring units 1211*a*, 1211*b*, . . . , and 1211*n*.

Note that since the operations of the monitoring units 1211*a*, 1211*b*, . . . , and 1211*n* are the same, the following describes a monitoring unit 1211 as an exemplary one of the monitoring units 1211*a*, 1211*b*, . . . , and 1211*n*.

The monitoring unit 1211 is stored in a predetermined storage area of the electronic terminal 1102 to monitor a protection measure targeted for monitoring. The monitoring unit 1211 is specifically a program, etc.

The monitoring unit 1211 pre-stores a protection identifier "Point x-y" for the protection measure targeted for monitoring.

The monitoring unit 1211 monitors whether the protection measure targeted for monitoring has been attacked by an external source.

If a judgment is made that an attack has occurred, the monitoring unit 1211 notifies the detection information generation unit 1201 of the attack and the protection identifier of the protection measure targeted for monitoring.

Note that in the following description, when there is no need to distinguish between the monitoring units 1211a, 1211b, ..., 1211n, the monitoring unit 1211 is described.

(4) History Management Unit 1205

Since the history management unit 1205 is similar to the history management unit 205 described in Embodiment 1, description thereof is omitted here.

Note that the history management table T100 shown in FIG. 4 is used where necessary in the following description.

(5) Detection Information Generation Unit 1201

Since the detection information generation unit 1201 is similar to the detection information generation unit 201 described in Embodiment 1, description thereof is omitted here.

(6) Signature Attachment Unit 1202

Since the signature attachment unit 1202 is similar to the signature attachment unit 202 described in Embodiment 1, description thereof is omitted here.

(7) Date and Time Information Acquisition Unit 1203

Since the date and time information acquisition unit 1203 is similar to the date and time information acquisition unit 203 described in Embodiment 1, description thereof is omitted here.

(8) Storage Destination Selection Unit 1204

Since the storage destination selection unit 1204 is similar to the storage destination selection unit 204 described in Embodiment 1, description thereof is omitted here.

(9) Transmission Unit 1214

Upon receiving the detection information and the untransmitted detection information with the signature data attached, and the management ID, from the detection information generation unit 1201, the transmission unit 1214 transmits the detection information and the untransmitted detection information with the signature data attached, and the management ID, to the server 1101 via the network 1103.

(10) Protection Method Reception Unit 1212

The protection method reception unit 1212 receives the protection measure and one or more monitoring units determined by the server 1101 from the server 1101 via the network 1103.

Specifically, the protection method reception unit 1212 receives, from the server 1101, new secure information pertaining to a new protection measure applied to the protected property 250 or the key 251 shown in FIG. 3, and one or more monitoring units.

(11) Protection Method Update Unit 1213

The protection method update unit 1213 replaces, that is to say updates, secure information currently stored in the secure storage (secure information storage unit 1216), with new secure information received by the protection method reception unit 1212.

Also, the protection method update unit 1213 stores the one or more received monitoring units in a predetermined storage area in the electronic terminal 1102 to monitor the one or more new protection measures.

2.3 Server 1101

The following describes the structure of the server 1101.

Figure 12:
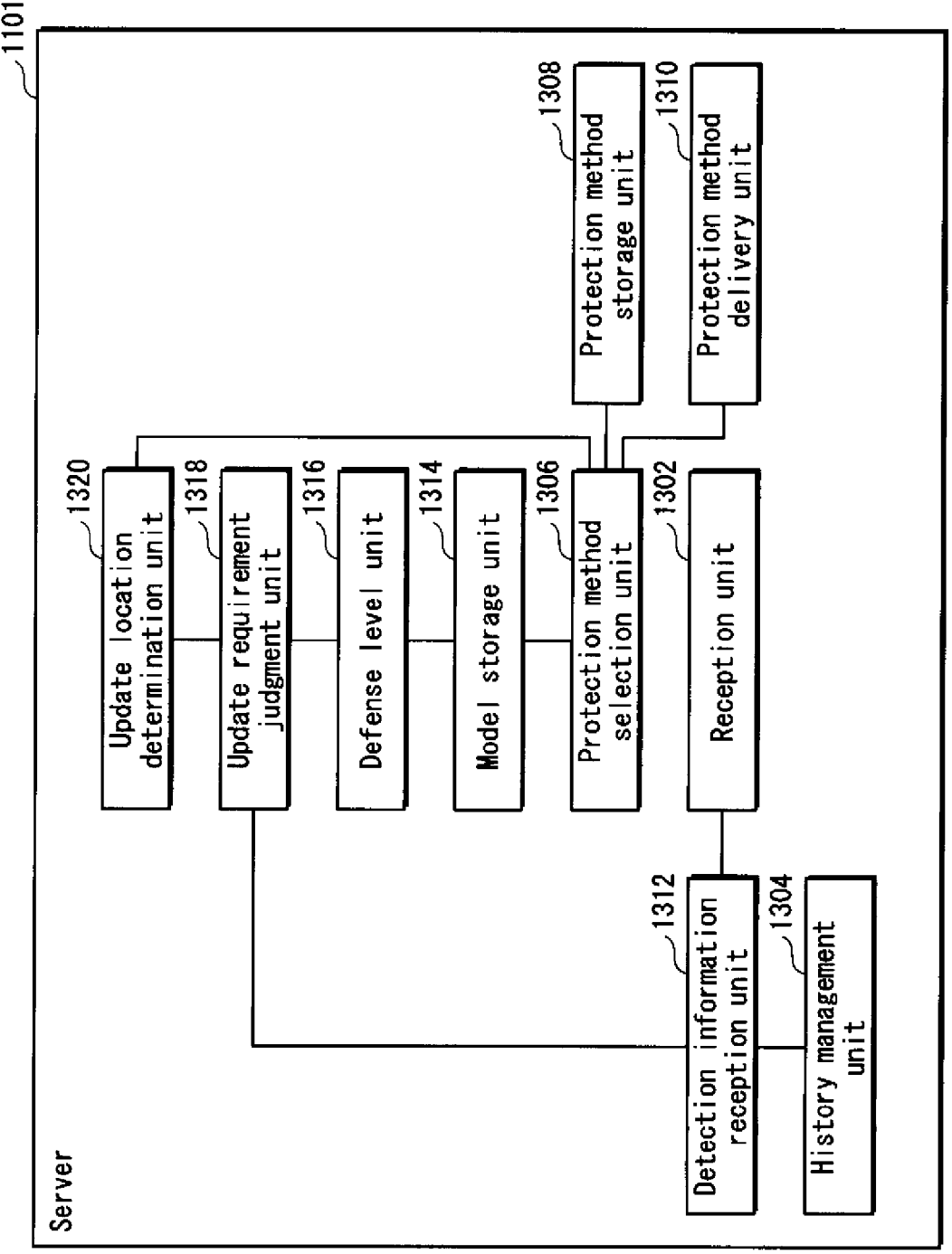
FIG. 12 is a block diagram showing the structure of a server 1101.

As shown in FIG. 12, the server 1101 includes a reception unit 1302, a history management unit 1304, a protection method selection unit 1306, a protection method storage unit 1308, a protection method delivery unit 1310, a detection information reception unit 1312, a model storage unit 1314, a defense level calculation unit 1316, an update requirement judgment unit 1318, and an update location determination unit 1320.

(1) Reception Unit 1302

Upon receiving the one or more pieces of detection information with the signature data attached and the management ID from the electronic terminal 1102 via the network 1103, the reception unit 1302 outputs the received one or more pieces of detection information with the signature data attached and the management ID to the detection information reception unit 1312.

(2) Detection Information Reception Unit 1312

A public key (PK) corresponding to the secret key (SK) stored in the electronic terminal 1102 is correlated to the management ID of the electronic terminal 1102, and stored in advance.

Upon receiving the one or more detection information pieces with signature data attached and the management ID from the reception unit 1302, the detection information reception unit 1312 acquires the public key (PK) corresponding to the received management ID.

The detection information reception unit 1312 verifies the signature data corresponding to the one or more detection information pieces received with use of the acquired public key. Note that since signature verification is known technology, description thereof is omitted here.

If a judgment is made, as a result of the signature verification, that the received one or more detection information pieces were transmitted from the electronic terminal 1102, the detection information reception unit 1312 stores the received one or more detection information pieces in correspondence with the received management ID in the history management unit 1304.

Furthermore, the detection information reception unit 1312 outputs the received management ID, the protection identifier included in each piece of detection information, and an update requirement instruction to the update requirement judgment unit 1318.

(3) History Management Unit 1304

Since the history management unit 1304 is similar to the history management unit 304 described in Embodiment 1, description thereof is omitted here.

Note that the history management table T200 shown in FIG. 6 is used where necessary in the following description.

(4) Model Storage Unit 1314

The model storage unit 1314 stores, for each of the electronic terminals 1102a, ..., 1102b, security implementation model information (hereinafter referred to simply as model information), pertaining to security measures currently applied in that electronic terminal. Specifically, the model information is stored in correspondence with the management ID.

Note that the model information 230 shown in FIG. 3 is used in the following description where necessary.

(5) Update Requirement Judgment Unit 1318

Upon receiving a judgment instruction, the management ID, and the one or more protection identifiers from the detection information reception unit 1312, the update requirement judgment unit 1318 outputs, to the defense level calculation unit 1316, the received one or more protection identifiers, the management ID, and a calculation instruction to calculate a defense level.

Upon receiving the one or more calculated defense levels from the defense level calculation unit 1316, the update requirement judgment unit 1318 acquires the value of the protected property 250 from the model information 230 stored in the model storage unit 1314. Then the update requirement judgment unit 1318 compares each of the acquired values to the received defense level.

When a judgment is made that the defense level is less than or equal to the value of the property 250, the update requirement judgment unit 1318 outputs the update location determination instruction to determine an update location, the management ID, and the one or more protection identifiers received from the detection information reception unit 1312 to the update location determination unit 1320.

(6) Defense Level Calculation Unit 1316

The defense level calculation unit 1316 receives the calculation instruction, the management ID, and one or more protection identifiers from the update requirement judgment unit 1318.

The defense level calculation unit 1316, with use of the model information that is stored in the model storage unit 1314 and corresponds to the received management ID, acquires, from among all protection paths that could be passed by a third party intending unauthorized analysis to reach the protected property, the protection paths that include one or more protection measures that correspond to the received one or more received protection identifiers.

For each of the acquired protection paths, the defense level calculation unit 1316 calculates a defense level pertaining to a security strength of the protection path excluding the protection measure to which the attack has been detected.

The defense level calculation level 1316 outputs, to the update requirement judgment unit 1318, the defense level calculated for each of the acquired protection paths.

Note that the defense levels for the protection paths are calculated according to the same calculation method as Embodiment 1.

(7) Update. Location Determination Unit 1320

Upon receiving the update location determination instruction, the management ID, and the one or more protection identifiers from the update requirement judgment unit 1318, the update location determination unit 1320 determines, based on the security implementation model of the security state after the attack, one or more locations requiring an update and the defense level required for each of the one or more update locations.

The update location determination unit 1320 outputs, to the protection method selection unit 1306, the determined one or more update locations, the defense level required for each of the one or more update locations, and the management ID.

Note that since the method of determining the update locations and the defense levels is similar to that of the update location determination unit 209, description thereof is omitted here.

(8) Protection Method Storage Unit 1308

The protection method storage unit 1308 stores a plurality of protection methods that can be used by the electronic terminal 1102, organized by management ID.

The following describes a specific example.

The protection method storage unit 1308 stores a plurality of types of model information, each having a different protection pattern by which the electronic terminal 1102 protects the property 250. Note that each piece of the model information includes a management ID, a model identifier identifying the piece of model information, and a secure information piece indicating the model information, in correspondence with each other.

Similarly to Embodiment 1, the model information stored in the protection method storage unit 1308 is, for example, the model information 230 shown in FIG. 3, model information in which the property 250 is protected by an encryption that is different from the encryption 232 indicated by the model information 230, model information in which a certain protection measure exists between the code obfuscation 243 and the debugger disabling 242 indicated by the model information 230, etc.

Also, for each of the protection measures, the protection method storage unit 1308 stores a corresponding monitoring unit for monitoring the protection measure.

(9) Protection Method Selection Unit 1306

The protection method selection unit 1306 receives, from the update location determination unit 1320, the management ID, the one or more update locations and the defense level corresponding to each of the one or more update locations.

The protection method selection unit 1306 selects, based on the received one or more update locations and the defense level corresponding to each of the update locations, a protection method and one or more monitoring units appropriate for transmitting from the protection method storage unit 1308 to the electronic terminal 1102.

The following describes a specific example.

The protection method selection unit 1306 stores the model identifiers corresponding to the model information stored in the electronic terminal 1102, in correspondence with the management ID of the electronic terminal 1102, in a secure storage area.

The protection method selection unit 1306 receives the management ID, the one or more update locations, and the defense level corresponding to each of the one or more update locations from the update location determination unit 1320.

The protection method selection unit 1306 acquires a model identifier corresponding to the received management ID from the secure storage area.

The protection method selection unit 1306 acquires model information corresponding to the acquired model identifier from the protection method storage unit 1308. Based on the acquired model information, the one or more received locations requiring an update, and the defense level required for each of the locations requiring an update, the protection method selection unit 1306 acquires, from the protection method storage unit 1308, new model information, in addition to a new model identifier and new secure information corresponding to the new model information.

The protection method selection unit 1306 acquires a new monitoring unit corresponding to each of the one or more new protection measures included in the acquired new secure information.

The protection method selection unit 1306 transmits the acquired new secure information and one or more new monitoring units to the electronic terminal 1102 to which an attack was detected, via the protection method delivery unit 1310.

The protection method selection unit 1306 replaces, that is to say updates, the model information that is stored in the model storage unit 1314 and corresponds to the received management ID with the acquired new model information.

The protection method selection unit 1306 replaces, that is to say updates, the model identifier corresponding to the management ID of the electronic terminal 1102 that is the transmission destination currently stored in the secure storage unit with the model identifier corresponding to the acquired new model information.

(10) Protection Method Delivery Unit 1310

Upon receiving the new secure information from the protection method selection unit 1306, the protection method delivery unit 1310 transmits the received new secure information to the electronic terminal 1102 to which an attack was detected, via the network 1103.

2.4 Operations of the Electronic Terminal 1102

The following describes the operations of the electronic terminal 1102 while monitoring for an attack from an external source.

(1) Transmission Processing of the Detection Information

Since the transmission processing of the detection information performed by the electronic terminal 1102 is realized by the steps from step S5 to S30 and S40 in FIG. 7, description thereof is omitted here.

(2) Update Processing

Figure 13:
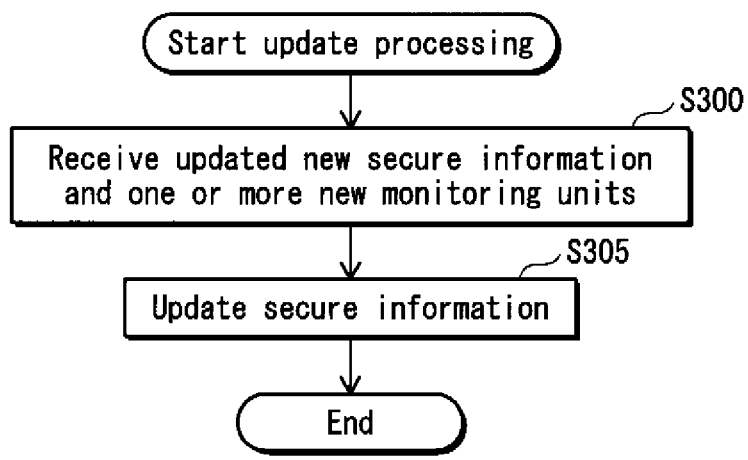
FIG. 13 is a flowchart showing operations of update processing.

The following describes update processing performed by the electronic terminal 1102 with use of the flowchart shown in FIG. 13.

The protection method reception unit 1212 of the electronic terminal 1102 receives updated new secure information and one or more new monitoring units from the server 1101 (step S300).

The electronic terminal 1102, with use of the protection method update unit 1213, updates the secure information currently stored in the secure storage (secure information storage unit 1216) with new secure information received by the protection method reception unit 1212 (step S305). Also, at this time, the electronic terminal 1102, with use of the protection method update unit 1213, stores the one or more received monitoring units for monitoring the one or more new protection measures included in the new secure information in a predetermined storage area in the electronic terminal 1102.

2.5 Operations of the Server 1101

Figure 14:
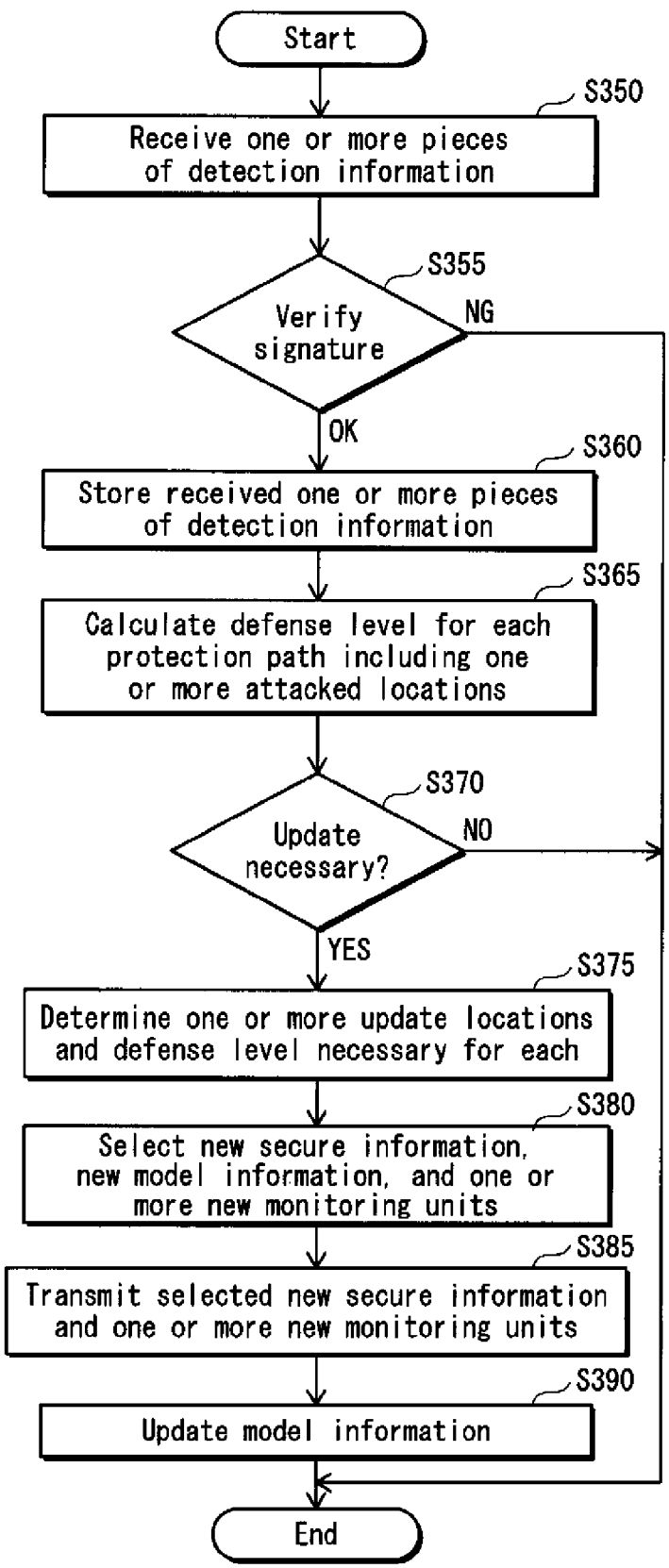
FIG. 14 is a flowchart showing operations of the server 1101.

The following describes the operations of the server 1101 with reference to the flowchart of FIG. 14.

The server 1101, with use of the detection information reception unit 1312, receives the one or more detection information pieces with signature data attached and the management ID from the electronic terminal 1102 (step S350).

The server 1101, with use of the detection information reception unit 1312, performs signature verification on the received detection information (step S355).

If the authenticity of the received detection information is verified by the signature verification ("OK" in step S355), the server 1101, with use of the detection information reception unit 1312, stores each of the received one or more detection information pieces in correspondence with the received management ID in the history management unit 1304 (step S360).

The server 1101, with use of the defense level calculation unit 1316, calculates a defense level pertaining to the security strength of each path including one or more protection measures to which an attack has been detected, excluding the one or more protection measures to which the attack has been detected (step S365).

The server 1101, with use of the update requirement judgment unit 1318, judges whether an update is required by comparing each of the defense levels calculated by the defense level calculation unit 1316 to the value of the protected property 250 (step S370).

If an update is judged to be required ("YES" in step S370), the server 1101, with use of the update location determination unit 1320, determines one or more locations requiring an update and a defense level required for each of the update locations, based on the security implementation model corresponding to the electronic terminal 1102 for which the detection information was transmitted, that is, the electronic terminal 1102 to which the attack was detected (step S375).

The server 1101, with use of the protection method selection unit 1306, selects new secure information, new model information corresponding to the new secure information, and one or more new monitoring units from the protection method storage unit 1308 based on the determined one or more locations requiring an update and the defense level required for each of the update locations (step S380).

The server 1101, with use of the protection method delivery unit 1310, transmits the new model information and one or more new monitoring units selected by the protection method selection unit 1306 to the electronic terminal 1102 to which the attack was detected (step S385).

The server 1101, with use of the protection method selection unit 1306, updates the model information that is stored in the model storage unit 1314 and corresponds to the received management ID with the new acquired model information (step S390).

At this time, the server 1101, with use of the protection method selection unit 1306, performs an operation to update the model identifier corresponding to the management ID of the electronic terminal 1102 that is the transmission destination currently stored in the secure storage area with the model identifier corresponding to the new acquired model information.

Also, if the received detection information is judged to be unauthentic as a result of the signature verification ("NG" in step S355), and a judgment is made that an update is not required ("NO" in step S370), the server 1101 ends the processing.

3. Additional Notes

Although monitoring the new secure information after the update is not mentioned in the above-described Embodiments 1 and 2, needless to say, any further new associated property that is added in the updated content of the new secure information should also be protected.

For example, in the model information 230 in FIG. 3, when an attack to the debugger terminal concealment 241 is detected, an encryption 244 may be added as a new protection measure between the code obfuscation 243 and the debugger disabling 242 on the second protection path 261.

In this case, the key 251 is code-obfuscated, and furthermore is protected in a state of being encrypted. Since another key is required for decrypting the encryption, a key 252 is added as a new associated property to the new secure information. If not protected, the key 252 can be acquired easily. In that case, adding the encryption 244 to strengthen the protection path 261 becomes meaningless. In view of this, it is necessary to protect the key 252 that has become the new associated property.

Figure 15:
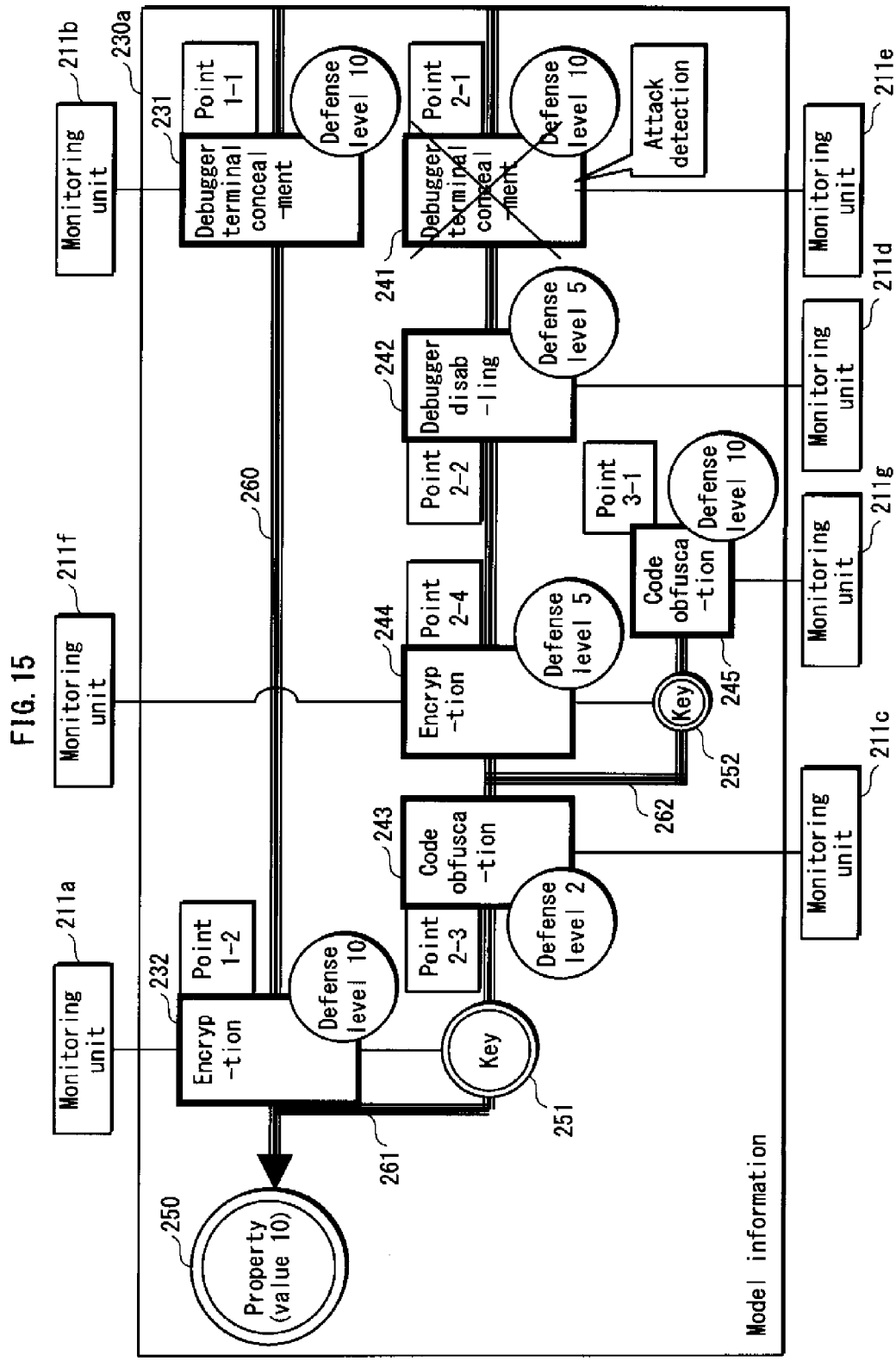
FIG. 15 shows the structure of model information 230a generated by updating the model information 230.

FIG. 15 shows specific model information 230a pertaining to this case.

In FIG. 15, as described above, the encryption 244 has been added as a new protection measure between the code obfuscation 243 and the debugger disabling 242, and as a result of this addition, the key 252 that is a new associated property of has been added. The key 252 is protected by the code obfuscation 245 as a protection measure. Note that, needless to say, monitoring units 211f and 211g have also been added to monitor the added encryption 244 and the code obfuscation 245. Also, at this time, a third protection path 262 to reach the property 250 is newly formed, and the defense level of the third protection path 262 is "12". The defense level of the second protection path 261 has changed from "17" to "12".

Applying a protection measure to a new associated property in this way enables strengthening the protection state of the new security information as a whole.

4. Embodiment 3

The following describes Embodiment 3 with a focus on aspects that are different from Embodiment 1.

In addition to the protection method updating described in Embodiment 1, Embodiment 3 also includes cases of updating the protection method for a version upgrade of the protection measures, and updating the protection method when the defense level of a protection measure has been reduced due to success of deciphering the encryption, deciphering a code that has been code-obfuscated, etc.

The following describes the structures and operations of each device. Note that constituent elements that perform identical operations to ones in Embodiment 1 have been given identical reference notations, and description thereof is omitted here.

4.1 Structure of Electronic Terminal 102A

The following describes the structure of the electronic terminal 102A.

Figure 16:
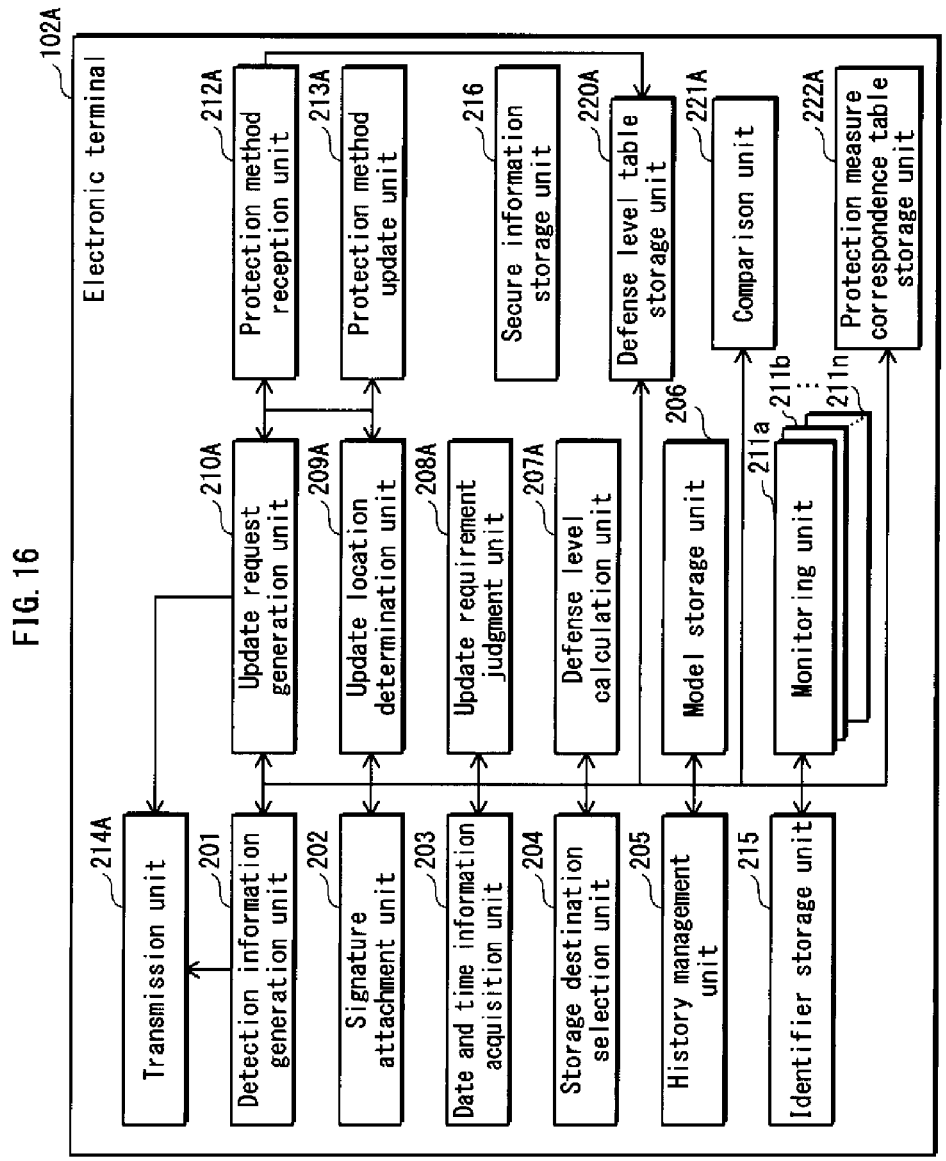
FIG. 16 is a block diagram showing the structure of an electronic terminal 102A.

As shown in FIG. 16, the electronic terminal 102A includes the detection information generation unit 201, the signature attachment unit 202, the date and time information acquisition unit 203, the storage destination selection unit 204, the history management unit 205, the model storage unit 206, the monitoring units 211a, 211b, ..., 211n, the identifier storage unit 215, the secure information storage unit 216, a defense level calculation unit 207A, an update requirement judgment unit 208A, an update location determination unit 209A, an update request generation unit 210A, a protection method reception unit 212A, a protection method update unit 213A, a transmission unit 214A, a defense level table storage unit 220A, a comparison unit 221A, and a protection measure correspondence table storage unit 222A.

Figure 17:
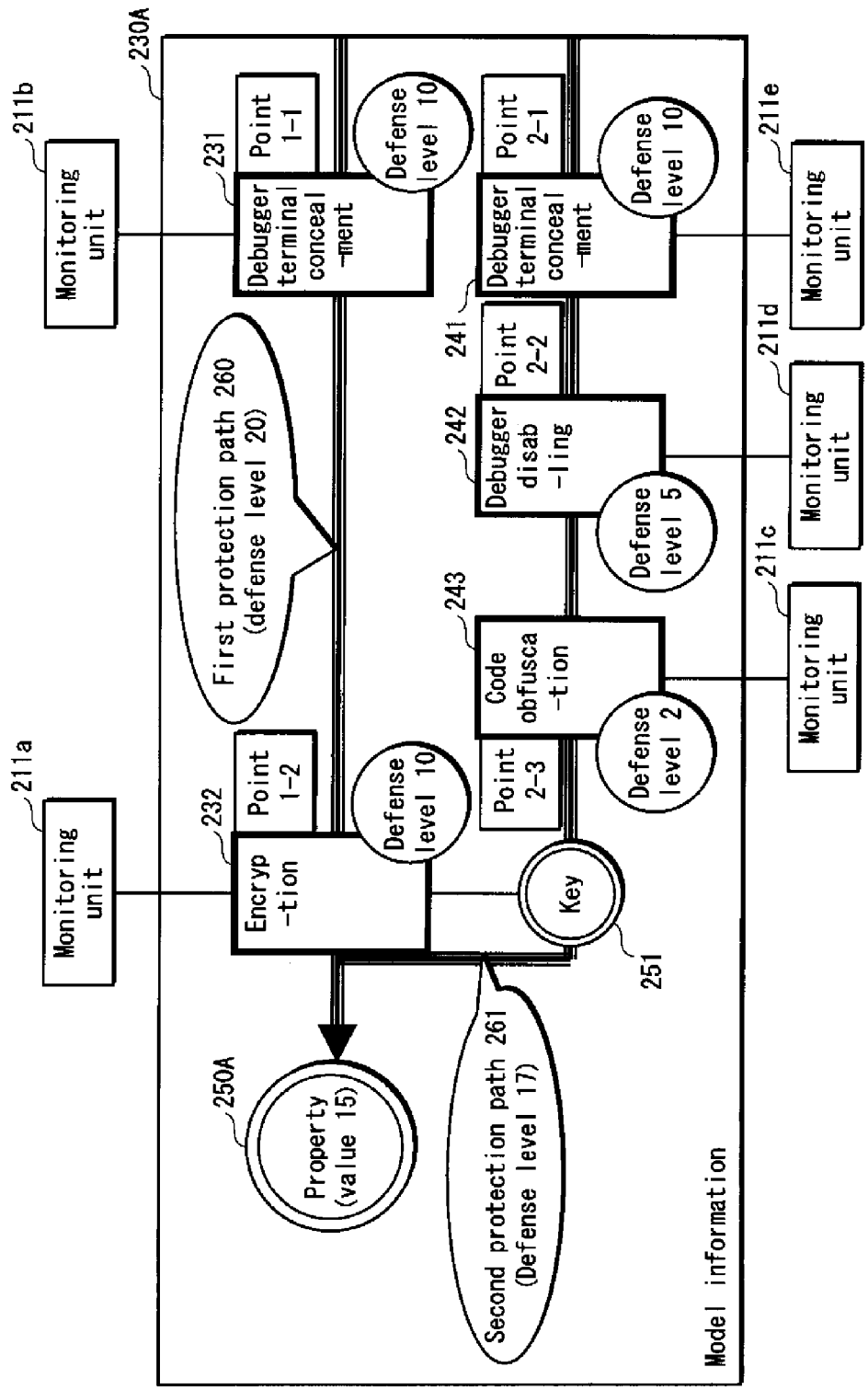
FIG. 17 shows the structure of the model information 230A.

Note that the model storage unit 206 stores therein model information 230A shown in FIG. 17. The difference between the model information 230A and the model information 230 described in Embodiment 1 (see FIG. 3) is the value of the property. In FIG. 3, the value of the property 250 is "10", and in the present description, the value of the property 250A is "15".

The following describes the defense level calculation unit 207A, the update requirement judgment unit 208A, the update location determination unit 209A, the update request generation unit 210A, the protection method reception unit 212A, the protection method update unit 213A, the transmission unit 214A, the defense level table storage unit 220A, the comparison unit 221A, and the protection measure correspondence table storage unit 222A.

(1) Defense Level Table Storage Unit 220A

The defense level table storage unit 220A stores therein a defense level table T300 received by the protection method reception unit 212A from the server 101A.

As shown in FIG. 18, the defense level table T300 includes an area for storing a set constituted from a protection measure management ID, a protection measure, and a defense level.

The protection measure management ID is for uniquely identifying a single protection measure. The entry in the "protection measure" field indicates the name of the protection measure corresponding to the protection measure management ID. The entry in the "defense level" field indicates the defense level of the protection measure.

(2) Protection Measure Correspondence Table Storage Unit 222A

The protection measure correspondence table storage unit 222A stores therein a protection measure correspondence table T400 that correlates one or more protection measures included in the model information 230 to the protection measure included in the defense level correspondence table.

As shown in FIG. 19, in the protection measure correspondence table T400, the protection measure management ID is for uniquely identifying a single protection measure, and the entry in the "protection measure" field indicates the name of the protection measure corresponding to the protection measure management ID. Also, the "point of use" indicates a position in the model information 230 where the corresponding protection measure is located, and in the present description, the "point of use" is the protection identifier described in Embodiment 1.

It is apparent from the protection identifier which position on which protection path the protection measure is used. For example, it is apparent from the protection measure management ID "ID1" and the protection measure correspondence table T400 that an encryption A in the defense level table T300 indicates the protection measure corresponding to the Point 1-2 in the model information 230.

(3) Comparison Unit 221A

The comparison unit 221A compares the defense level of the protection measures included in the model information 230, that is, the defense level of the protection measures currently protecting the property 230 (hereinafter referred to as the "first defense level"), to the defense level corresponding to the protection measures included in the defense level table T300 (hereinafter referred to as the "second defense level"), and judges whether the second defense level is less than the first defense level.

When the judgment is affirmative, the comparison unit 221A specifies the protection path including the protection measures.

For example, it is apparent from FIGS. 16, 17, and 18 that although the protection measure (encryption A) corresponding to the protection identifier "Point 1-2", that is, the encryption 232 shown in FIG. 16, currently has the defense level "10", this protection measure has the defense level "5" in the defense level table T300, and thus the defense level has been reduced. In view of this, the comparison unit 221A specifies the first protection path 260 as the protection path including the encryption 232.

Note that although in this example, there is one specified protection path, depending on the content of the defense level table T300, there are cases of specifying a plurality of protection paths. That is to say, the comparison unit 221A specifies one or more protection paths in accordance with the results of the comparison.

(4) Defense Level Calculation Unit 207A

In addition to the content of the operations of the defense level calculation unit 207 described in Embodiment 1, the defense level calculation unit 207A performs the following operations.

For each of the one or more protection paths specified by the comparison unit 221A, the defense level calculation unit 207A calculates the defense level of the protection path, with use of the second defense level corresponding to the protection measure that has the reduced defense level.

For example, the defense level calculation unit 207A calculates "12" as the defense level of the first protection path 260 including the encryption 232 that has the reduced defense level.

(5) Update Requirement Judgment Unit 208A

In addition to the content of the operations of the update requirement judgment unit 208 described in Embodiment 1, the update requirement judgment unit 208A also performs the following operations.

For each of the one or more protection paths specified by the comparison unit 221A, the update requirement judgment unit 208A determines whether an update is required, based on the defense level calculated by the defense level calculation unit 207A and the value of the property 250A. Note that the method of judgment is the same as in Embodiment 1.

For example, the update requirement judgment unit 208A compares the defense level "12" calculated for the first protection path 260 to the value "15" of the property 250A, and as a result of the comparison, judges whether an update is required.

(6) Update Location Determination Unit 209A

In addition to the content of the operations of the update location determination unit 209 described in Embodiment 1, the update location determination unit 209A performs the following operations.

When a judgment is made by the update requirement judgment unit 208A that an update is required for the protection path including the protection measure that has the reduced defense level, the update location determination unit 209A, with use of the defense level table T300, specifies a new protection measure that can be used instead of the protection measure that has the reduced defense level. Note that when there are a plurality of protection paths judged to require an update, a new protection measure is specified for each protection path.

Specifically, the update location determination unit 209A specifies a new protection measure which will cause the defense level of the protection path to be greater than or equal to the value of the property.

For example, the update location determination unit 209A specifies an encryption B from the defense level table T300 so that the defense level of the protection path will exceed the value "15" of the property 250A. At this time, by changing the encryption A to the encryption B, the defense level of the first protection path 260 increases from "12" to "18", which exceeds the value "15" of the property 250A.

(7) Update Request Generation Unit 210A

In addition to the content of the operations performed by the update request generation unit 210A described in Embodiment 1, the update request generation unit 210A also performs the following operations.

When the update location specification unit 209A has specified the new protection measure that can be used instead of the protection measure that has the reduced defense level, the update request generation unit 210A generates a second update request information piece constituted from a protection measure management ID corresponding to the protection measure, a protection identifier corresponding to the protection measure that has the reduced defense level, and a management ID stored in the identification storage unit 215, and transmits the generated second update request information to the server 101A via the transmission unit 214.

Note that when there are a plurality of protection paths judged to require an update, the update request generation unit 210A generates second update request information that is a set of information including a protection measure management ID of the new protection measure, and a protection identifier of the protection measure targeted to be updated to the new protection measure, for each of the new protection measures specified for each of the protection paths.

(8) Transmission Unit 214A

In addition to the content of the operations of the transmission unit 214 described in Embodiment 1, the transmission unit 214A also performs the following operation.

The transmission unit 214A transmits the second update request information generated by the update request generation unit 210A to the server 101A.

(9) Protection Measure Reception Unit 212A

In addition to the content of the operations of the protection method reception unit 212 described in Embodiment 1, the protection method reception unit 212A also performs the following operations.

The protection method reception unit 212A receives the defense level table T300 from the server 101A.

Similarly to Embodiment 1, to update the protection method when the defense level of the protection method has been reduced, the protection method reception unit 212 receives, from the server 101A, one or more protection measures determined based on the transmitted second update request information piece, and one or more new monitoring units corresponding to the one or more protection measures.

Specifically, the protection method reception unit 212A receives, from the server 101A, new secure information, new model information indicating the new secure information, and one or more new monitoring units, pertaining to the new protection measure for the protected property 250A or the key 251.

Also, the protection method reception unit 212A further receives a new protection measure correspondence table based on the protection measure management ID corresponding to each of the one or more protection measures included in the new secure information, the protection measure corresponding to the protection measure management ID, and the point of use.

(10) Protection Method Update Unit 213A

In addition to the operations of the protection method update unit 213 described in Embodiment 1, the protection method update unit 213A also performs the following operations.

The protection method update unit 213A stores the defense level table T300 received by the protection method reception unit 212A in the defense level table storage unit 220A.

To update the protection method when the defense level of the protection method has been reduced, the protection method update unit 213A updates the currently stored secure information with new secure information, updates the currently stored model information 230 with new model information, and stores the received one or more monitoring units in a predetermined storage area in the electronic terminal 102 for monitoring the one or more new protection measures. Note that when a program for decryption processing of the secure information is included, the program is stored in a predetermined area.

Also, the protection method update unit 213A updates the protection measure correspondence table stored in the current protection measure correspondence table storage unit 222A with the new protection measure correspondence table received by the protection method reception unit 212A.

4.2 Structure of the Server 101A

The following describes the structure of the server 101A.

Figure 20:
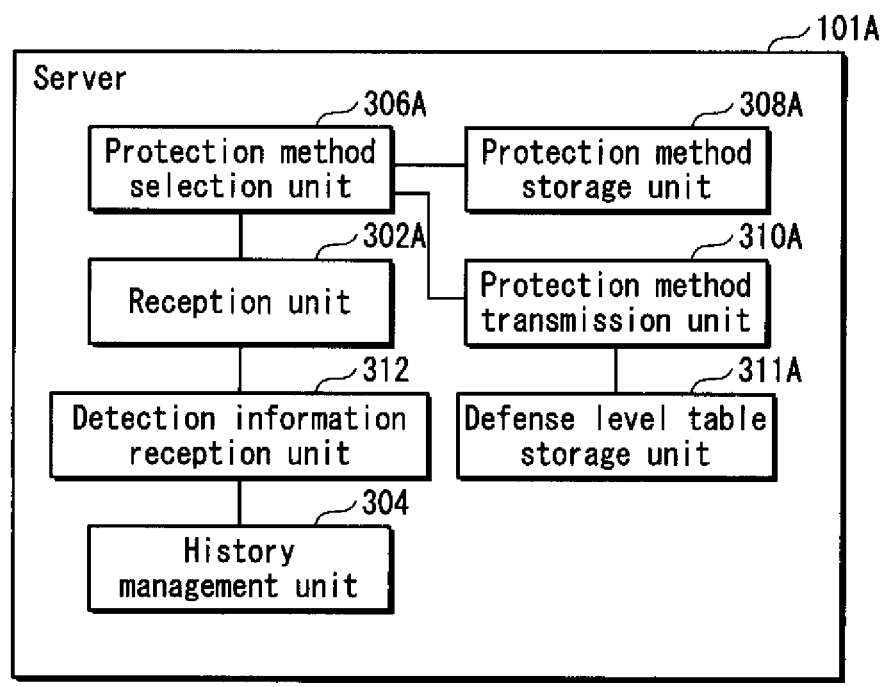
FIG. 20 is a block diagram showing the structure of the server 101A.

As shown in FIG. 20, the server 101A includes the history management unit 304, the detection information reception unit 312, a reception unit 302A, a protection method selection unit 306A, a protection method storage unit 308A, a protection method delivery unit 310A, and a defense level table storage unit 311A.

The following describes the reception unit 302A, the protection method selection unit 306A, the protection method storage unit 308A, the protection method delivery unit 310A, and the defense level table storage unit 311A.

(1) Reception Unit 302A

In addition to the operations of the reception unit 302 described in Embodiment 1, the reception unit 302A performs the following operations.

Upon receiving the second update request information from the electronic terminal 102A, the reception unit 302A outputs the received second update request information to the protection method selection unit 306A.

(2) Protection Method Storage Unit 308A

Similarly to the protection method storage unit 308 described in Embodiment 1, the protection method storage unit 308A stores a plurality of types of model information, each having a different protection pattern by which the electronic terminal 102A protects the protected property 250A. Also, similarly to the protection method storage unit 308 described in Embodiment 1, the protection method storage unit 308A stores secure information corresponding to each of these pieces of model information.

The protection method storage unit 308A stores a protection measure correspondence table corresponding to each of the plurality of types of model information.

Also, similarly to the protection method storage unit 308 described in Embodiment 1, the protection method storage unit 308A stores a monitoring unit for monitoring each of the protection measures.

(3) Protection Method Selection Unit 306 A

In addition to the content of the operations of the protection method selection unit 306 described in Embodiment 1, the protection method selection unit 306A also performs the following operations.

Upon receiving the second update request information from the reception unit 302A, the protection method selection unit 306A, with use of one or more sets including a protection measure management ID and a protection identifier included in the received second update request information, acquires model information and a protection measure correspondence table corresponding to the model information from the protection method storage unit 308A.

The following describes a specific example.

The protection method selection unit 306A acquires, from the protection method storage unit 308A, model information in which protection measures identified by each of the protection measure IDs in the second update request information are in locations specified by corresponding protection identifiers (protection identifiers included in the set including the protection measure management ID).

The protection method selection unit 306A acquires the secure information and the protection measure correspondence table corresponding to the acquired model information.

The protection method selection unit 306A further acquires a new monitoring unit corresponding to each of the one or more new protection measures included in the acquired new secure information.

The protection method selection unit 306A transmits the acquired new model information, a protection measure correspondence table corresponding to the new model information, the new secure information and the one or more monitoring units to the electronic terminal 102A pertaining to the update request via the protection method delivery unit 310A.

Similarly to the protection method selection unit 306 described in Embodiment 1, the protection method selection unit 306A updates the model identifier corresponding to the management ID of the electronic terminal 102A that is the transmission destination currently stored in the secure storage area with the model identifier corresponding to the new acquired model information.

(4) Defense Level Table Storage Unit 311A

The defense level table storage unit 311A stores a defense level table to be transmitted to the electronic terminal 102A.

(5) Protection Method Delivery Unit 310A

In addition to the operations of the protection method delivery unit 310 described in Embodiment 1, the protection method delivery unit 310A performs the following operation.

In response to an instruction from the user, the protection method delivery unit 310A transmits the defense level table stored in the defense level table storage unit 311A to the electronic terminal 102A.

The protection method delivery unit 310A transmits, to the electronic terminal 102A, the new model information acquired by the protection method selection unit 306A, the protection measure correspondence table corresponding to the new model information, the new secure information and the one or more monitoring units.

Note that when the new protection measure is encrypted, the protection method delivery unit 310A includes a decryption processing program in the secure information, similarly to the protection method delivery unit 310 described in Embodiment 1.

4.3 Operations of the Electronic Terminal 102A

Figure 21:
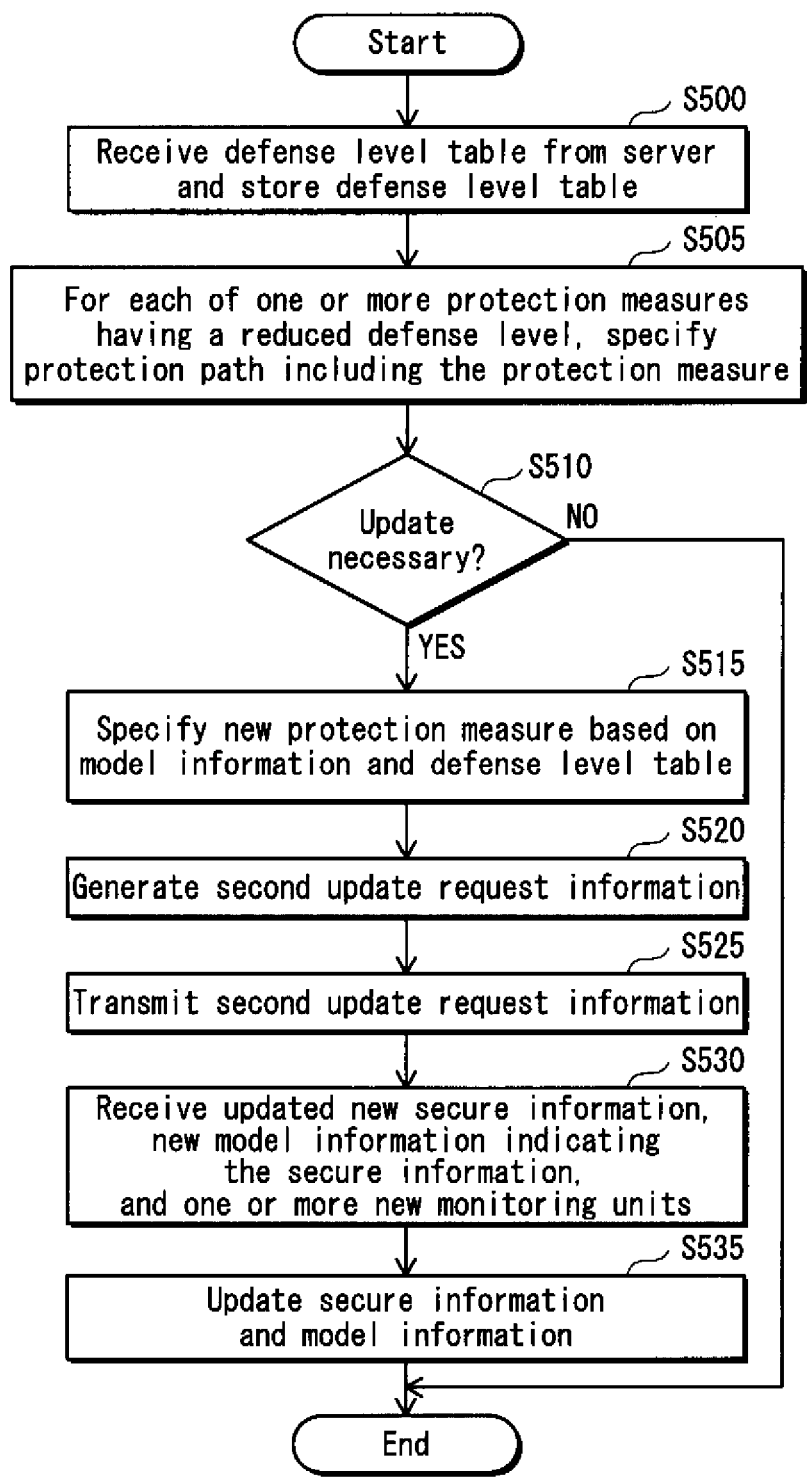
FIG. 21 shows the flow of operations of the electronic terminal 102A when the defense level has been reduced.

The following describes the processing pertaining to updating the secure information when the defense level of the protection measure has been reduced, with reference to FIG. 21.

The protection method reception unit 212A of the electronic terminal 102A receives the defense level table from the server 101A, and stores the received defense level table in the defense level table storage unit 220A (step S500).

For each of the protection measures included in the model information 230, the comparison unit 220A compares the first defense level of the protection measure to the second protection level corresponding to the protection measure in the defense level table T300, and judges whether the second defense level is less than the first defense level. If the judgment is affirmative, the comparison unit 221A specifies which protection path includes each protection measure for which the second defense level is less than the first defense level (step S505).

For each protection path that includes at least one protection measure to which an attack was detected, the defense level calculation unit 207A calculates a defense level indicating a security strength of the protection path excluding the attacked protection measure. The update requirement judgment unit 208A compares each of the defense levels calculated by the defense level calculation unit 207A to the value of the protected property 250, and judges whether an update is required (step S510).

When the judgment is affirmative ("YES" in step S510), the update location determination unit 209A of the electronic terminal 102A specifies a new protection measure so that the defense level of the protection path to be updated becomes greater than the property value, with use of the model information 230A stored in the model storage unit 206, and the defense level table T300 stored in the defense level table storage unit 220A (step S515).

The update request generation unit 210A generates second update request information as a single set including a protection measure management ID of a new protection measure and a protection identifier of a protection measure to be updated on the protection path, for each new protection measure specified on each protection path (step S520). The transmission unit 214A transmits the generated second update request information to the server 101A (step S525).

The protection method reception unit 212A receives, from the server 101A, new secure information determined based on the transmitted second update request information, new model information indicating the new secure information, a protection measure correspondence table corresponding to the new model information, and one or more monitoring units (step S530).

The protection method update unit 213A updates the secure information currently stored in the secure information storage unit 216 to the new secure information received by the protection method reception unit 212, updates the model information 230 stored in the current model storage unit 206 to the new model information received by the protection method reception unit 212, and updates the protection measure correspondence table stored in the current protection measure correspondence table storage unit 222A to a new protection measure correspondence table received by the protection method reception unit 212A (step S535). Also, at this time, the protection method update unit 213A stores the received one or more monitoring units in a predetermined storage area in the electronic terminal 102A to monitor the one or more new protection measures included in the new secure information.

If it is judged that an update is not required ("NO" in step S510), the electronic terminal 102A ends the processing.

4.4 Operations of the Server 101A

Figure 22:
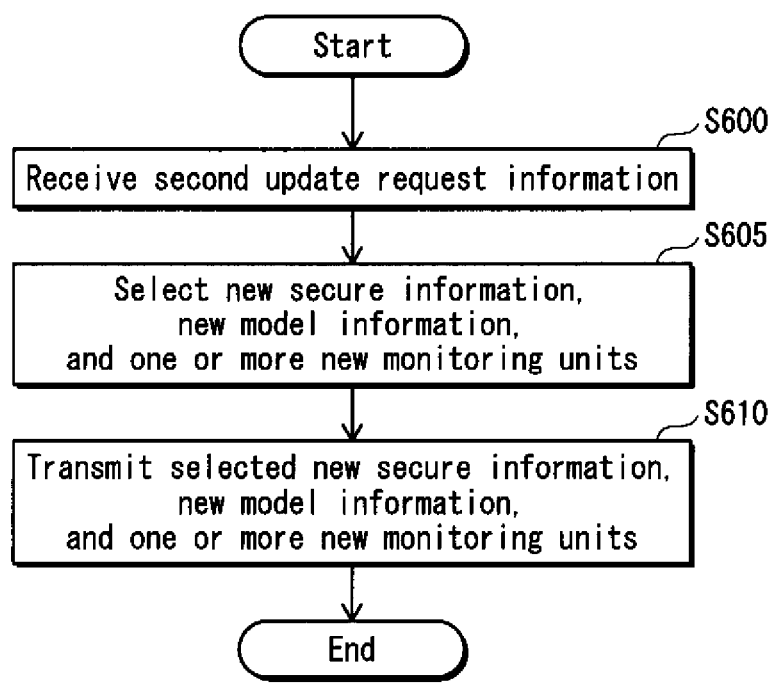
FIG. 22 is a flowchart showing operations of the server 101A when the defense level of a protection measure has been reduced.

The following describes the operations of the server 101A with reference to the flowchart in FIG. 22.

The server 101A receives the second update request information from the electronic terminal 102A (step S600).

With use of one or more sets each including a protection measure management ID and a protection identifier included in the received second update request information, the protection method selection unit 306A of the server 101A selects new secure information, new model information corresponding to the new secure information, and one or more new monitoring units appropriate for transmitting from the protection method storage unit 308A to the electronic terminal 102A (step S605).

The protection method delivery unit 310A transmits, to the electronic terminal 102A pertaining to the update request, the new model information, the new secure information, and the one or more new monitoring units selected by the protection method selection unit (step S610).

At this time, the protection method selection unit 306A of the server 101A performs an operation to update the model identifier corresponding to the management ID of the electronic terminal 102A that is the transmission destination currently stored in the secure storage area to the model identifier corresponding to the acquired new model information.

5. Modifications

Although described based on the above embodiments, the present invention is of course not limited to such embodiments. Modifications such as the following are also included in the present invention.

(1) Although in Embodiments 1 and 2, adding and updating protection measures are considered as methods of updating security measures, protection measures may also be deleted. For example, when a protection measure has undergone unauthorized analysis, that protection measure is likely to be already broken and therefore useless to leave in place. In this case, the capacity of the electronic terminal 102 can be used more effectively by deleting this protection measure.

Similarly, when a new protection measure has been acquired from the server 101, the new protection measure may be used to overwrite the protection measure that underwent unauthorized analysis.

(2) Although Embodiments 1 and 2 describe a case of updating a protection measure only when an unauthorized attack has occurred, the present invention is not limited to this.

For example, the electronic terminal may strengthen the defense level by acquiring a new protection measure that becomes available when the electronic terminal accesses the server, either periodically or in response to an instruction from a user or a program. In other words, when a new property to be protected by a new protection measure exists in the server, the electronic terminal acquires the new property from the server, and updates the currently stored property with the new property.

Also, even when the electronic terminal has not been attacked specifically, the electronic terminal may perform an update by replacing each protection measure with a protection measure having the same defense level, either periodically or in response to an instruction from a user or a program. This enables making analysis more difficult, since the protection measures that might be subject to unauthorized analysis are changed. A protection measure may also be replaced with a protection measure having a stronger defense level instead of a protection measure having the same defense level. However, the higher the defense level of a protection measure, the longer the execution time generally is for that protection measure, so a structure that maintains defense levels at the minimum necessary is preferable from the standpoint of operation speed of the electronic terminal. Also, some of the protection measures may be updated with protection measures having a lower defense level, as long as doing so would not result in reducing the defense level of the protection path as a whole.

(3) In the above Embodiments 1 and 2, each protection measure added in an update is determined so that by adding the protection measure, the defense level of the protection path becomes greater than the property value. However, the invention is not limited to this example, and for example, the locations to be updated and the necessary defense levels may be determined without comparing the property value to the defense level. Specifically, this may be achieved by analyzing the defense level of each protection path, and if a protection path is discovered that has a weaker defense level than the other protection paths, adding a protection measure to that protection path.

Also, replacing an attacked protection measure with a protection measure having a same defense level is possible. A protection measure may also be replaced with a protection measure having a stronger defense level instead of a protection measure having the same defense level. However, the higher the defense level of a protection measure, the longer the execution time generally is for that protection measure, so a structure that maintains defense levels at the minimum necessary is preferable from the standpoint of operation speed of the electronic terminal.

Also, the electronic terminal may be configured to judge whether the defense level of the protection path is less than a threshold other than the property value, and depending on the result of this judgment, to add a protection measure to the protection path that has become less than the threshold.

(4) Although in Embodiments 1 and 2, a protection measure is added when the defense level of the protection path is less than the property value, the present invention is not limited to this. For example, the device may be configured so that regardless of whether the defense level is less than the property value, any protection measure that has undergone unauthorized analysis is updated. As a method of selecting a protection measure in such a case, for example, the device may be configured to select a protection measure that has a stronger defense level than the protection measure that had undergone unauthorized analysis.

(5) There is a possibility of the property value fluctuating due to advances in technology or other technological circumstances. For this reason, the device may be configured so that updating the property value is also possible. In this case, it is preferable for the electronic terminal to detect when the property value has been updated and to update the protection measures in accordance with the updated property value.

(6) In Embodiments 1 and 2, the monitoring units monitor whether the protection measures have been attacked. However, the monitoring units may further monitor whether the history management table has been illicitly overwritten.

(7) In Embodiments 1 and 2, the monitoring units monitor whether the protection measures have been attacked. However, the monitoring units may further set a trap such as a honeypot, and monitor whether the honeypot trap is attacked.

(8) In Embodiments 1 and 2, the monitoring units monitor whether the protection measures have been attacked. In this context, the electronic terminal may further record, in a history management table, normal operation record information indicating a time up to which each protection measure has been used normally, without any unauthorized tampering. In this case, the normal operation record information need not be configured to accumulate continuously, but rather may be configured so that each time a new piece of normal operation record information is recorded, the new piece of normal operation record information overwrites a piece of previously recorded normal operation record information. This normal operation record information is used to evaluate a degree of difficulty in attacking each protection measure or a model leading to each protection measure, for example. As a specific example, the normal operation record information may be used as reference information for calculating defense levels of protection measures in the next model created.

(9) The timing when the monitoring units of Embodiments 1 and 2 perform monitoring may be i) when the electronic terminal starts up, ii) before execution of each protection measure, iii) during execution of each protection measure, or iv) after execution of each protection measure. Also, monitoring may be performed according to a specified event pertaining to each protection measure, performed periodically, or performed at an irregular timing. For safer implementation, it is preferable for the timing of the monitoring to be unpredictable to an attacker.

(10) In Embodiments 1 and 2, it is assumed that the protection measures and the monitoring units are realized by programs. However, the present invention is not limited to this. For example, when a reconfigurable processor or the like that can reconfigure connections of circuit cells or settings is used in the electronic terminal, the protection measures may be realized by these circuits. In this case, the protection measures transmitted from the server may be setting data indicating an updated circuit structure of the reconfigurable processor or the like. At this time, the electronic terminal 102 updates the circuit structure of the reconfigurable processor based on the received setting data.

(11) In Embodiments 1 and 2, the protection measures to be added in an update are stored by the server. However, the electronic terminal may also be configured to store several protection measures as a precaution, and to self-repair with use of these stored protection measures.

For example, when storing a code obfuscation program as a protection measure, the electronic terminal obfuscates the encrypted property with use of the stored code obfuscation program. The electronic terminal updates the currently stored secure information with code-obfuscated secure information.

Also, when storing an encryption program as a protection measure, the electronic terminal may further encrypt the encrypted property with use of the stored encryption program. Alternatively, the device may be configured to first decrypt the current encryption of the property, and then to use the stored encryption program to encrypt the property.

Also, although in the above description, the electronic terminal strengthens the protection state of the property to be protected, the present invention is not limited to this. Instead of applying a stored protection measure to the property to be protected, the electronic terminal may apply the stored protection measure to another property associated with the property to be protected (for example, the key 251 shown in FIG. 3), thereby strengthening the defense level thereof in the secure information.

(12) Although in Embodiments 1 and 2, the electronic terminal transmits detection information upon detecting an attack from an external source, the present invention is not limited to this.

The electronic terminal may periodically transmit detection information that is stored in the electronic terminal and has not been transmitted to the server.

(13) In Embodiments 1 and 2, the electronic terminal creates signature data for each of the one or more pieces of detection information transmitted to the server. However, the present invention is not limited to this.

The signature attachment unit of the electronic terminal may be configured to concatenate one or more detection information pieces to be transmitted to the server, and to generate one piece of signature data for the concatenated detection information.

(14) Although in Embodiments 1 and 2, the server acquires new secure information in order to update the secure information stored in the electronic terminal, the present invention is not limited to this. The server may instead be configured to extract only updated portions of the secure information, and to transmit the extracted portions to the electronic terminal.

In this case, upon receiving the updated portions from the server, the electronic terminal updates the locations to be updated with the received updated portions in the stored secure information.

(15) The method of calculating the defense level is not limited to the method described in Embodiments 1 and 2.

For example, instead of time and cost, the defense level may be calculated based on a level of technological skill required to perform analysis. Alternately, the defense level may be calculated based on a bit length of the property.

Alternatively, the defense level may be calculated on a scale of 1 to 5 or on a scale of 1 to 10, based on the severity of risk to a security system when analysis is performed. In this case, the value of the property may also be assigned on a scale of 1 to 5 or on a scale of 1 to 10.

(16) Although in Embodiment 1, the model storage unit stores security implementation model information, the present invention is not limited to this.

Instead of security implementation model information, the model storage unit may manage information such as version information of the security implementation model information.

(17) Although Embodiments 1 and 2 describe a case in which one server corresponds to a plurality of electronic terminals, the present invention is not limited to this.

One server may be assigned to each electronic terminal.

In this case, the electronic terminal is not required to transmit the management ID to the server.

Also, it is sufficient for the server to store model information of the corresponding electronic terminal, secure information, model identifiers, etc.

(18) In Embodiment 1, when the electronic terminal detects an attack, the calculation of defense level, the judgment of whether an update is required, and the determination of the update location are performed by the electronic terminal. Also, in Embodiment 2, when the electronic terminal detects an attack, the calculation of the defense level, the judgment of whether an update is required, and the determination of the update location are performed by the server.

The allocation of functions is not limited to the method of allocation described in Embodiments 1 and 2.

The specific functions to be performed by the server and those to be performed by the client may be changed as appropriate.

For example, the calculation of the defense level and the judgment of whether an update is required may be performed by the electronic terminal, and the determination of the update location may be performed by the server. Alternatively, the calculation of defense level may be performed by the electronic terminal, and the judgment of whether an update is required and the determination of the update location may be performed by the server.

(19) Although in Embodiments 1 and 2, one monitoring unit is assigned to each of the protection measures, the present invention is not limited to this.

One monitoring unit may monitor all the protection measures.

In this case, the monitoring unit may monitor whether an attack has occurred as a separate operation for each of the plurality of protection measures. Specifically, this can be realized by assigning a monitoring sub-unit for each protection measure, so that each monitoring sub-unit monitors for an attack on the corresponding protection measure.

(20) In Embodiments 1 and 2, information transmitted and received between the electronic terminal 102 and the server 101 may be encrypted.

(21) In Embodiments 1 and 2, after detecting an attack to a protection measure, the electronic terminal may remove that protection measure as a target for monitoring.

(22) In Embodiments 1 and 2, each time a protection measure and a monitoring unit are added, the secure information is updated accordingly. However, it is not always necessary to update secure information in accordance with an added protection measure. For example, when the protection measure to be added is a program or the like that does not permit access to an area that stores secure information except to a user who has a specified piece of information, the secure information itself does not change as a result of adding the protection measure. In this type of situation, the secure information need not be updated. Note that the electronic terminal may be configured to judge whether to update the secure information by checking the content of the protection measure to be added. Alternatively, control may be performed by attaching a flag, indicating whether the secure information requires an update, directly to the protection measure delivered from the server.

(23) In Embodiments 1 and 2, the defense level of a path is determined to be the sum of defense levels of the protection measures on the path. However, the method of calculating the defense level of a path is not limited to this. For example, multiplication may be used instead of addition. Also, in a situation where there are two or more consecutive protection measures that are similar (encryption according to the same algorithm, etc.) on the same path, if one or more of the similar protection measures is broken, the remaining similar protection measures are likely to be broken too. Therefore, reducing the quantities to be summed, etc., may also be used in the calculation method.

(24) In Embodiment 1, the property 250 and the associated property (the key 251) are stored in the secure information storage unit 216. However, the present invention is not limited to this. The property 250 and the associated property (the key 251) may each be stored in a different storage unit.

Also, the same type of storage assignment may be used in Embodiment 2.

(25) Although in the above embodiments, a decryption key for decrypting the encrypted property is given as an example of the associated property, the present invention is not limited to this.

For example, the associated property may be a key generation program for generating a decryption key. In this case, a protection measure (for example, encryption or code obfuscation) for the key generation program may be used.

(26) In Embodiment 1, an attack to the encrypted property 250 itself and an attack to the decryption program are given as specific examples of attacks to the encrypted property 250.

When encryption is used as a protection measure, an attack to the protection measure is either an attack to encrypted data or an encrypted program directly, similarly to the specific examples given above, or an attack to a decryption program for decrypting the encrypted data or the encrypted program.

Note that the decryption program for decrypting the encrypted data or program may be stored in the secure information storage unit 216, or may be stored in a storage area other than the secure information storage unit 216.

In this context, an attack to code obfuscation is an attack to the code-obfuscated program. A program targeted for code obfuscation is, for example, a key generation program for generating a key, or a decryption program for decrypting encrypted data or an encrypted program.

Note that a code-obfuscated program, similarly to a decryption program, may be stored in a secure information storage unit 216, or may be stored in a storage area other than the secure information storage unit 216.

(27) The devices described above may be computer systems structured specifically from a microprocessor, a ROM, a RAM, a hard disk unit, a display unit, a keyboard, a mouse, etc. A computer program is stored in the RAM or the hard disk unit. The devices achieve their functions as the microprocessor operates in accordance with the computer program. The computer program is a combination of multiple instruction codes each indicating a command to the computer in order to achieve predetermined functions. Note that the present invention is not limited to being a computer system that includes all of the elements of a microprocessor, a ROM, a RAM, a hard disk unit, a display unit, a keyboard, a mouse, etc., and may include only some of these elements.

(28) A portion or all of the constituent elements of the devices of the above embodiments and variations may be structured as a single system LSI (Large Scale Integration). A system LSI is a super multifunctional LSI manufactured by integrating a plurality of structural units onto a single chip. Specifically, it is a computer system including a microprocessor, a ROM, a RAM, and the like. A computer program is stored in the RAM. The system LSI achieves its functions as the microprocessor operates in accordance with the computer program.

Also, each constituent element included in the above-described devices may be on a separate chip, or some or all may be combined on a single chip.

Also, here, although referred to as a system LSI, an integrated circuit generated as described above may also be referred to as an IC, a system LSI, a super LSI, or an ultra LSI, depending on the degree of integration. Also, the method of integration is not limited to being LSI integration, but instead may be realized by a dedicated circuit or a general-purpose process. After LSI manufacture, the use of a field programmable gate array (FPGA) or a silicon flexible processor in which the connection and settings of circuit cells in the LSI can be restructured is possible.

Furthermore, if integration technology is developed that replaces LSIs due to progressive or derivative semiconductor technology, integration of functional blocks using this technology is naturally possible. For example, the application of biotechnology is a possibility.

(29) A portion or all of the constituent elements of the devices of the above embodiments and modifications may be structured as a removable IC card or stand-alone module. The IC card or the module is a computer system including a microprocessor, a ROM, and a RAM. The IC card and the module may include the above super multifunctional LSI. The IC card and the module achieve their functions as the microprocessor operates in accordance with the computer program. This IC card or module may be tamper resistant.

(30) The present invention may be the methods shown above. Also, the present invention may be computer programs for causing computers to realize the methods, or may be digital signals representing the computer programs.

Also, the present invention may be a computer-readable recording medium such as a flexible disk, a hard disk, a CD-ROM, an MO, a DVD, a DVD-ROM, a DVD-RAM, a BD (Blu-ray Disc), or a semiconductor memory on which the computer programs or the digital signals are recorded. The present invention may be the computer programs or the digital signals, which are recorded on these recording media.

Also, the present invention may be the computer programs or digital signals which are transmitted via an electronic communications circuit, a wireless or fixed-line communications circuit, a network such as the Internet, a data broadcast, etc.

Also, the present invention may be a computer system including a microprocessor and a memory, whereby the memory stores the computer programs, and the microprocessor operates in accordance with the computer programs.

Also, the present invention may be carried out by another independent computer system by transferring the programs or the digital signals which have been recorded on the recording media, or by transferring the programs or the digital signals via the network, etc.

(31) The present invention may be any combination of the above embodiments and modifications.

6. Summary (1) The present invention is an electronic terminal that stores confidential information protected by consecutive application of a plurality of protection measures for defense against an attack from a third party, the electronic terminal including one or more monitoring units for monitoring against an attack to each of the plurality of protection measures, an update judgment unit operable to judge whether to update a protection state of the confidential information when an attack is detected to one protection measure by one of the one or more monitoring units, and an update unit operable to, when the judgment by the update judgment unit is affirmative, update the protection state of the confidential information to a new protection state.

According to this structure, upon detecting an attack to a protection measure from an external source and judging that an update of the protection state is necessary, the electronic terminal can protect against falsification of confidential information by a third party, since the confidential information is protected in a new protection state in which either a new protection measure has been added to the sequence of protection measures from the protection measure to which an attack was detected to the confidential information, or an existing protection measure in the sequence has been strengthened.

(2) The update unit may update the protection state of the confidential information to a new protection state by replacing confidential information protected in a current protection state with confidential information protected in a new protection state. In the new protection state, either a new protection measure has been added to a sequence from the one protection measure to which an attack was detected to the confidential information, or existing protection measures that have not been attacked in the sequence have been strengthened.

According to this structure, the electronic terminal replaces confidential information stored in the current protection state with confidential information stored in a new protection state. Therefore, a third party cannot easily tell the difference between the protection state before the replacement and the protection state after the replacement.

(3) The electronic terminal may further include a communication judgment unit operable to judge whether communication can be performed with an external device via a network, and a transmission unit operable to, if the judgment is affirmative, transmit detection information to the external device indicating that an attack to the one protection measure has been detected. The update unit may receive, from the external device, confidential information protected in the new protection state in which a location to be updated in the sequence of protection measures has been determined based on the detection information.

According to this structure, the electronic terminal can notify the external device that an attack has occurred. Also, the electronic terminal can receive confidential information that is protected in a new protection state according to the attacked location.

(4) The electronic terminal may further include a storage unit that stores therein the detection information when the communication judgment unit has judged that transmission cannot be performed. When the judgment is affirmative and one or more untransmitted detection information pieces that have not been transmitted to the external device are protected by the protection measure, the transmission unit may be further operable to transmit the one or more untransmitted detection information pieces to the external device.

According to this structure, when the electronic terminal cannot transmit the detection information to the external device, the electronic terminal can store therein the detection information and transmit the stored untransmitted detection information when transmission becomes possible.

(5) Each of the plurality of protection measures may have a corresponding defense level against an attack, and each confidential information piece may have a corresponding value. The update judgment unit may include i) a calculation unit operable to calculate a defense level for a protection path of protection measures that have not been attacked between the one protection measure that has been attacked and the confidential information, with use of the defense levels of one or more protection measures on the path, and ii) an update judgment unit operable to compare the defense level of the protection path calculated by the calculation unit to the value, and when the defense level of the protection path is less than or equal to the value, to judge that the protection state of the confidential information is to be updated.

According to this structure, the electronic terminal calculates a defense level for the protection path from the one protection measure that has been attacked to the confidential information. With use of the calculated defense level and the value of the confidential information, the electronic terminal can determine whether an update is required. Accordingly, the electronic terminal can update the protection state to a sufficient necessary strength in accordance with the value of the confidential information to be protected.

(6) The update unit may further include i) a determination unit operable to, when the judgment by the update judgment unit is affirmative, determine a location on the protection path for adding a new protection measure or replacing an existing protection measure with a new protection measure, and determine a required defense level of the new protection measure so that the defense level of the protection path is greater than the value, ii) an acquisition unit operable to acquire confidential information protected in the new protection state, in which either a new protection measure having the determined defense level has been added in the determined location, or the existing protection measure in the location has been replaced by a new protection measure, and iii) a replacement unit operable to replace confidential information protected in the current protection state with confidential information protected in the new protection state acquired by the acquisition unit.

According to this structure, the electronic terminal determines a location to add a new protection measure or to replace an existing protection measure with a new protection measure, and the defense level of the new protection measure. Accordingly, upon detecting an attack, the electronic terminal can add a new protection measure having a defense level such that the defense level of the protection path from the one protection measure that has been attacked to the confidential information is greater than the value of the confidential information.

(7) The determination unit may transmit the determined location and the determined defense level to the external device that is connected to the network. The acquisition unit may receive, from the external device, confidential information protected in the new protection state, in which either the new protection measure having the determined defense level has been added to the location, or the new protection measure having the defense level has replaced the existing protection measure in the location.

According to this structure, the electronic terminal can request, from an external device, confidential information protected in a new protection state, in which either a new protection measure having the transmitted defense level has been added to the determined location, or a new protection measure has been added in place of an existing protection measure in the determined location, by transmitting the location and defense level of the new protection measure that is added or the existing protection measure that is replaced with the new protection measure to the external device.

(8) The determination unit may store therein path information indicating protection paths constituted from sequences of protection measures from each of the plurality of protection measures to the confidential information, and with use of the path information, may determine the location to add the new protection measure or the location to replace an existing protection measure with the new protection measure.

According to this structure, the electronic terminal, with use of the path information, can easily determine a location to add a new protection measure or to replace the existing protection measure with the new protection measure.

(9) The update unit may include a storage unit that stores therein the confidential information or a new protection measure to be used for protecting confidential information that is protected by one or more protection measures. The acquisition unit may acquire confidential information protected by a new protection measure by adding the new protection measure stored in the storage unit to the determined location, or by replacing the existing protection measure in the location with the new protection measure, and generating the new protection state.

According to this structure, upon detecting an attack from an external source, the electronic terminal can update the current protection state of the confidential information to a new protection state, independently without need for another device.

(10) When an attack to the one protection measure is detected by the monitoring unit, the update judgment unit makes a judgment to update the protection state. The update unit stores path information indicating protection paths constituted from protection measures from each of the plurality of protection measures to the confidential information. The update unit may further include i) a determination unit operable to, with use of the path information, determine a location to add a new protection measure or to replace an existing protection measure with a new protection measure in a sequence of protection measures that have not been attacked between the one protection measure that has been attacked and the confidential information, ii) an acquisition unit operable to acquire confidential information protected in a new protection state, in which either a new protection measure has been added in the determined location, or the existing protection measure in the location has been replaced by a new protection measure, and iii) a replacement unit operable to replace confidential information protected in a current protection state with confidential information protected in the new protection state acquired by the acquisition unit.

According to this structure, upon detecting an attack to a protection measure from an external source, the electronic terminal can protect against falsification of confidential information by a third party, since the confidential information is protected in a new protection state in which either a new protection measure has been added to the sequence of protection measures that have not been attacked from the protection measure to which an attack was detected to the confidential information, or an existing protection measure in the sequence has been strengthened. Also, by using the path information, the electronic terminal can easily determine the location to add the new protection measure or to replace an existing protection measure with a new protection measure that is stronger than the existing protection measure.

(11) Upon making a judgment that communication can be performed with the external device via the network, the update judgment unit may judge that the protection state be updated. The update unit may transmit, to the external device, detection information indicating that an attack to the one protection measure has been detected, and receive, from the external device, confidential information protected in a new protection state, in which either a new protection measure has been added to the sequence of protection measures that have not been attacked between the one protection measure to which an attack was detected and the confidential information, or an existing protection measure in the sequence has been replaced with a new protection measure. The update unit may update the confidential information protected in the current protection state with confidential information protected in the received new protection state.

According to this structure, upon receiving, from the external device, confidential information stored in a protection state in which a new protection measure has been added, the electronic terminal updates confidential information stored in the current protection state with confidential information stored in a new protection state. Therefore, a third party cannot easily tell the difference between the protection state before the replacement and the protection state after the replacement.

(12) The update unit may update the protection state of the confidential information to a new protection state either by adding a new protection measure to the sequence of protection measures that have not been attacked between the one protection measure to which an attack has been detected to the confidential information, or by replacing an existing protection measure in the sequence of protection measures that have not been attacked with a new protection measure.

According to this structure, the electronic terminal can easily update the protection state merely by adding or strengthening a protection measure.

(13) Also, the present invention is a management device for managing an electronic terminal that stores confidential information protected by consecutive application of a plurality of protection measures for defense against an attack from a third party, the management device including a reception unit operable to receive detection information indicating that an attack to a one protection measure has been detected, an update judgment unit operable to judge whether to update a protection state of the confidential information that is protected by the plurality of protection measures stored by the electronic terminal to a new protection state in which either a new protection measure has been added to a sequence of protection measures from the one protection measure to which the attack was detected to the confidential information, or an existing protection measure in the sequence of protection measures that have not been attacked has been strengthened, an acquisition unit operable to, if the judgment is affirmative, acquire confidential information protected in a protection state in which either a new protection measure has been added to the protection path, or an existing protection measure has been strengthened, and a transmission unit operable to transmit, to the electronic terminal, confidential information protected in the new protection state acquired by the acquisition unit.

According to this structure, the management device, upon receiving the detection information from the electronic terminal, judges whether updating the protection state is required, and if the judgment is affirmative, transmits confidential information to the electronic terminal in a new protection state in which either a new protection measure has been added to the sequence of protection measures that have not been attacked between the protection measure to which an attack was detected to the confidential information, or an existing protection measure in the sequence has been strengthened. By doing this, when an attack from an external source to a protection measure is detected, and the management device judges that an update of the protection state is required, falsification of the confidential information by a third party can be prevented since the electronic device can protect the confidential information in the new protection state.

(14) Each of the plurality of protection measures may have a corresponding defense level against an attack, and each confidential information piece may have a corresponding value. The update judgment unit may include i) a calculation unit operable to calculate a defense level for the protection path, with use of one or more defense levels of one or more protection measures on the protection path, and ii) an update judgment unit operable to compare the defense level of the protection path calculated by the calculation unit to the value, and when the defense level of the protection path is less than or equal to the value, to make a judgment that the protection state of the confidential information is to be updated.

According to this structure, the management device calculates a defense level for the protection path from the protection measure to which the attack was detected to the confidential information. The electronic terminal can determine whether an update is required with use of the calculated defense level and the value of the confidential information. Accordingly, the electronic terminal can update the protection state to a sufficient necessary strength according to the value of the confidential information to be protected.

(15) The acquisition unit may further i) when a judgment is made by the update judgment unit to update, determine a location on the protection path for adding a new protection measure or replacing an existing protection measure with a new protection measure, and determine a required defense level of the new protection measure so that the defense level of the protection path is greater than the value, and ii) acquire confidential information protected in a new protection state, in which either a new protection measure having the determined defense level has been added in the determined location, or the existing protection measure in the location has been replaced by a new protection measure.

According to this structure, The management device determines the location and defense level of a new protection measure to be added or to replace an existing protection measure. Therefore, when an attack is detected, the management device can add the new protection measure or replace the existing protection measure, so that the defense level of the protection path from the protection measure to which the attack was detected to confidential information is greater than the value of the confidential information.

(16) The acquisition unit may store therein path information indicating protection paths constituted from sequences of protection measures from each of the plurality of protection measures to the confidential information, and with use of the path information, may determine the location to add the new protection measure or the location to replace an existing protection measure with the new protection measure.

According to this structure, the management device, with use of the path information, can easily determine the location to add a new protection measure or to replace an existing protection measure with a new protection measure.

(17) When the detection information is received by the reception unit, the update judgment unit may make a judgment to update the protection state. The acquisition unit may further determine a location for adding a new protection measure or replacing an existing protection measure with a new protection measure in the sequence of protection measures that have not been attacked between the one protection measure which has been attacked to the confidential information, and acquire confidential information protected in the new protection state in which either the new protection measure has been added at the determined location, or the existing protection measure at the location has been replaced with the new protection measure.

According to this structure, the management device, upon receiving the detection information from the electronic terminal, determines the location to add the new protection measure or the location to replace an existing protection measure with a new protection measure, and transmit, to the electronic terminal, confidential information protected in a new protection state in which the new protection measure has been added to the determined location, or the new protection measure has replaced the existing protection measure in the determined location. By doing this, the electronic terminal can prevent falsification of the confidential information by a third party, since upon detecting an attack to a protection measure from an external source, the electronic device can protect the confidential information in a new protection state received from the external device.

(18) The reception unit may receive, as the detection information, location information indicating a location to add a new protection measure, or a location of an existing protection measure to be replaced with a new protection measure, in a sequence of protection measures that have not been attacked between the one protection measure to which an attack has been detected and the confidential information. The acquisition unit may acquire confidential information protected in the new protection state in which either a new protection measure has been added in the location indicated by the location information, or the existing protection measure in the location indicated by the location information has been replaced with a new protection measure.

According to this structure, upon receiving the location information from the electronic terminal, the management device transmits the confidential information to the electronic terminal, the confidential information being protected in a new protection state in which either a new protection measure has been added in the location indicated by the location information, or the existing protection measure in the location indicated by the location information has been replaced with a new protection measure. By doing this, the electronic terminal can prevent falsification of the confidential information by a third party, since upon detecting an attack to the protection measure from an external source, the electronic terminal can protect the confidential information in a new protection state received from the external device.

(19) Each of the plurality of protection measures may have a corresponding defense level against an attack, and each confidential information piece may have a corresponding value. The electronic terminal may i) calculate a defense level for a protection path with use of one or more defense levels of one or more protection measures on the protection path, and ii) with use of the calculated defense level and the value, determine a defense level required so that the defense level of the protection path becomes greater than the value. The reception unit may further receive the determined defense level. The acquisition unit may acquire confidential information protected by either adding a new protection measure having the determined defense level at the location indicated by the location information, or replacing an existing protection measure in the location indicated by the location information with the new protection measure.

According to this structure, upon receiving the defense level from the electronic terminal, the management device transmits confidential information to the electronic terminal, the confidential information being protected in a new protection state in which either a new protection measure having the received defense level has been added in the location indicated by the location information, or the existing protection measure in the location indicated by the location information has been replaced with a new protection measure. By doing this, the electronic terminal can prevent falsification of the confidential information by a third party, since upon detecting an attack to a protection measure from an external source, the electronic device can protect the confidential information in a new protection state. received from the external device.

(20) Also, the present invention is a management device for managing an electronic terminal that stores confidential information protected by consecutive application of a plurality of protection measures for defense against an attack from a third party, the management device including a reception unit operable to receive detection information indicating that an attack to a one protection measure has been detected, an update judgment unit operable to judge whether to update the confidential information that is protected by the plurality of protection measures stored by the electronic terminal to a new protection state in which either a new protection measure has been added to the sequence of protection measures from the one protection measure to which the attack was detected to the confidential information, or an existing protection measure in the sequence has been strengthened, an acquisition unit operable to, if the judgment is affirmative, acquire a new protection measure for strengthening the protection state of the confidential information, and a transmission unit operable to transmit the new protection measure acquired by the acquisition unit to the electronic terminal.

According to this structure, since the management device transmits protection measures for strengthening the protection state of the confidential information to the electronic terminal, the electronic terminal can easily update the protection state merely by adding or strengthening the protection measures. By doing this, the electronic terminal can strengthen the protection state of the confidential information, and thus falsification of the confidential information by a third party can be prevented.

INDUSTRIAL APPLICABILITY

An electronic terminal or server of the present invention can be used operationally, continually, and repeatedly in manufacture and sales industries.

The invention claimed is:
1. An electronic terminal comprising:
a first storage unit for storing therein confidential information to be protected;
a plurality of protection measures that are provided along an attack route extending from an external source to the confidential information stored in the first storage unit, and are operable to intercept an access from the external source to the confidential information via the attack route;
a plurality of monitoring units operable to monitor for an attack to any of the plurality of protection measures from the external source;
a second storage unit for storing therein (i) value information that is attached to the confidential information and expresses a value of the confidential information, and (ii) a plurality of defense level information pieces each attached to one of the plurality of protection measures and expressing a defense level value of a corresponding protection measure against an attack from the external source; and
a control unit operable to, when (i) an attack to any of the plurality of protection measures has been detected, and (ii) a sum of defense level values for protection measures that have not been attacked remaining on a partial route of the attack route extending between the attacked protection measure and the confidential information is less than the value expressed by the value information that is attached to the confidential information, update a protection measure that can be updated among the remaining protection measures on the partial route, wherein the update of the protection measure that can be updated among the remaining protection measures on the partial route causes the sum of the defense level values on the partial route to be greater than the value expressed by the value information that is attached to the confidential information.

2. The electronic terminal of claim 1 wherein the confidential information is encrypted by a predetermined algorithm, and the protection measure that can be updated is a program for executing a decryption algorithm for decrypting the encrypted confidential information.

3. The electronic terminal of claim 1 further comprising:

a third storage unit for storing therein a key generation program for generating a decryption key to be used in decrypting the confidential information that has been encrypted by a predetermined algorithm;

a plurality of second protection measures that are provided along a second attack route extending to the confidential information stored in the first storage unit, via the key generation program stored in the third storage unit, and are operable to intercept an access from the external source to the key generation program via the second attack route; and a plurality of second monitoring units operable to monitor for an attack to any of the plurality of second protection measures from the external source, wherein a plurality of defense level information pieces are each attached to one of the plurality of second protection measures, each expressing a defense level value of a corresponding second protection measure against an attack from the external source, the control unit is further operable to, when (i) an attack to any of the second protection measures has been detected, and (ii) a sum of the defense level values for protection measures that have not been attacked remaining on a second partial route of the second attack route extending between the attacked second protection measure and the confidential information, is less than the value expressed by the value information that is attached to the confidential information, update the key generation program, and the update of the key generation program causes the sum of the defense level values on the second partial route to be greater than the value expressed by the value information that is attached to the confidential information.

4. The electronic terminal of claim 1 further comprising:

a third storage unit for storing therein a decryption key to be used in decrypting the confidential information that has been encrypted by a predetermined algorithm;

a fourth storage unit for storing therein a predetermined program for accessing the decryption key;

a plurality of second protection measures that are provided along a second attack route extending to the confidential information stored in the first storage unit, via the predetermined program stored in the fourth storage unit, and are operable to intercept an access from the external source to the predetermined program via the second attack route; and a plurality of second monitoring units operable to monitor for an attack to any of the plurality of second protection measures from the external source, wherein a plurality of defense level information pieces are each attached to one of the plurality of second protection measures, each expressing a defense level value of a corresponding second protection measure against an attack from the external source, the control unit is further operable to, when (i) an attack to any of the second protection measures has been detected, and (ii) a sum of the defense level values for protection measures that have not been attacked remaining on a second partial route of the second attack route extending between the attacked second protection measure and the confidential information, is less than the value expressed by the value information that is attached to the confidential information, update the predetermined program, and the update of the predetermined program causes the sum of the defense level values on the second partial route to be greater than the value expressed by the value information that is attached to the confidential information.

5. The electronic terminal of claim 4 wherein the predetermined program for accessing the decryption key is a decryption program for decrypting the encrypted decryption key when the decryption key has been encrypted.

6. The electronic terminal of claim 5 wherein the decryption program has been obfuscated.

7. The electronic terminal of claim 1 further comprising:

a third storage unit for storing therein a protection measure to be used for performing an update, wherein the control unit updates the protection measure that can be updated with use of the protection measure to be used for performing the update, that is stored in the third storage unit.

8. The electronic terminal of claim 1 further comprising:

a communication unit connected to an external management device that manages the electronic terminal, wherein the control unit is further operable to, when (i) an attack to any of the plurality of protection measures has been detected, and (ii) a sum of the defense level values for protection measures remaining on the partial route is less than the value expressed by the value information that is attached to the confidential information, transmit detection information indicating the detection and the comparison to the management device via the communication unit, receive a new protection measure from the management device, in accordance with the detection information, and update the protection measure that can be updated to the new protection measure, and the update of the protection measure that can be updated to the new protection measure causes the sum of the defense level values for the protection measures remaining on the partial route to be greater than the value expressed by the value information that is attached to the confidential information.

9. The electronic terminal of claim 1 further comprising:

a communication unit connected to an external management device that manages the electronic terminal, wherein the control unit is further operable to, when (i) an attack to any of the plurality of protection measures has been detected, and (ii) a sum of the defense level values for remaining protection measures on the partial route is less than the value expressed by the value information that is attached to the confidential information, transmit detection information indicating the detection and the comparison to the management device via the communication unit, receive a new protection measure from the management device, in accordance with the detection information, and add the new protection measure to the partial route, and the addition of the new protection measure causes the sum of the defense level values for the protection measures remaining on the partial route to be greater than the value expressed by the value information that is attached to the confidential information.

10. The electronic terminal of claim 1 further comprising:
a communication unit connected to an external management device that manages the electronic terminal; and
a third storage unit for storing therein a plurality of second defense level information pieces received from the management device, each expressing an updated value of a defense level value of a corresponding protection measure, wherein
the control unit is further operable to (i) compare each piece of defense level information stored in the second storage unit to a piece of corresponding defense level information stored in the third storage unit, (ii) when a result of the comparison is that the defense level value expressed by the defense level information is less than the defense level value expressed by the second defense level information, calculate a sum of defense levels for the plurality of protection measures with reference to the second defense level information, and (iii) when the calculated sum is less than the value expressed by the value information that is attached to the confidential information, update a protection measure corresponding to the second defense level information that is less than the defense level information, and
the update of the protection measure corresponding to the second defense level information causes the total of the defense level values on the attack route to be greater than the value expressed by the value information that is attached to the confidential information.

11. A control method for an electronic terminal,
the electronic terminal comprising:
a first storage unit for storing therein confidential information to be protected;
a plurality of protection measures that are provided along an attack route extending from an external source to the confidential information stored in the first storage unit, and are operable to intercept an access from the external source to the confidential information via the attack route;
a plurality of monitoring units operable to monitor for an attack to any of the plurality of protection measures from the external source; and
a second storage unit for storing therein (i) value information that is attached to the confidential information and expresses a value of the confidential information, and (ii) a plurality of defense level information pieces each attached to one of the plurality of protection measures and expressing a defense level value of a corresponding protection measure against an attack from the external source; wherein
the control method comprises:
judging, when an attack to any of the plurality of protection measures has been detected, whether a sum of defense level values for protection measures that have not been attacked remaining on a partial route of the attack route extending between the attacked protection measure and the confidential information is less than the value expressed by the value information that is attached to the confidential information, and if the sum is less than the value, updating a protection measure that can be updated among the remaining protection measures on the partial route,
wherein the updating of the protection measure that can be updated among the remaining protection measure on the partial route causes the sum of the defense level values on the partial route to be greater than the value expressed by the value information that is attached to the confidential information.

12. A non-transitory computer-readable medium having a computer program stored thereon for performing control on an electronic terminal,
the electronic terminal comprising:
a first storage unit for storing therein confidential information to be protected;
a plurality of protection measures that are provided along an attack route extending from an external source to the confidential information stored in the first storage unit, and are operable to intercept an access from the external source to the confidential information via the attack route;
a plurality of monitoring units operable to monitor for an attack to any of the plurality of protection measures from the external source; and
a second storage unit for storing therein (i) value information that is attached to the confidential information and expresses a value of the confidential information, and (ii) a plurality of defense level information pieces each attached to one of the plurality of protection measures and expressing a defense level value of a corresponding protection measure against an attack from the external source; wherein
the computer program causes a computer of the electronic terminal to perform the processing of:
judging, when an attack to any of the plurality of protection measures has been detected, whether a sum of defense level values for protection measures that have not been attacked remaining on a partial route of the attack route extending between the attacked protection measure and the confidential information is less than the value expressed by the value information that is attached to the confidential information, and
if the sum is less than the value, updating a protection measure that can be updated among the remaining protection measures on the partial route,
wherein the updating of the protection measure that can be updated among the remaining protection measures on the partial route causes the sum of the defense level values on the partial route to be greater than the value expressed by the value information that is attached to the confidential information.

13. An integrated circuit used in an electronic terminal, the electronic terminal comprising:
a first storage unit for storing therein confidential information to be protected;
a plurality of protection measures that are provided along an attack route extending from an external source to the confidential information stored in the first storage unit, and are operable to intercept an access from the external source to the confidential information via the attack route;
a plurality of monitoring units operable to monitor for an attack to any of the plurality of protection measures from the external source;

a second storage unit for storing therein (i) value information that is attached to the confidential information and expresses a value of the confidential information, and (ii) a plurality of defense level information pieces each attached to one of the plurality of protection measures and expressing a defense level value of a corresponding protection measure against an attack from the external source; and a control unit operable to, when (i) an attack to any of the plurality of protection measures has been detected, and (ii) a sum of defense level values for protection measures that have not been attacked remaining on a partial route of the attack route extending between the attacked protection measure and the confidential information is less than the value expressed by the value information that is attached to the confidential information, update a protection measure that can be updated among the remaining protection measures on the partial route, wherein the update of the protection measure that can be updated among the remaining protection measures on the partial route causes the sum of the defense level values on the partial route to be greater than the value expressed by the value information that is attached to the confidential information.

* * * * *